US012006435B2

(12) United States Patent
Dyksterhouse

(10) Patent No.: US 12,006,435 B2
(45) Date of Patent: *Jun. 11, 2024

(54) BI-POLYMER THERMOPLASTIC

(71) Applicant: Joel A. Dyksterhouse, Cross Village, MI (US)

(72) Inventor: Joel A. Dyksterhouse, Cross Village, MI (US)

( * ) Notice: Subject to any disclaimer, the term of this patent is extended or adjusted under 35 U.S.C. 154(b) by 40 days.

This patent is subject to a terminal disclaimer.

(21) Appl. No.: 17/679,445

(22) Filed: Feb. 24, 2022

(65) Prior Publication Data

US 2022/0340721 A1    Oct. 27, 2022

Related U.S. Application Data

(63) Continuation of application No. 16/093,148, filed as application No. PCT/US2017/027268 on Apr. 12, 2017, now Pat. No. 11,274,184.

(Continued)

(51) Int. Cl.
*C08J 5/24*     (2006.01)
*C08J 5/04*     (2006.01)
(Continued)

(52) U.S. Cl.
CPC .............. *C08L 77/02* (2013.01); *C08J 5/042* (2013.01); *C08J 5/043* (2013.01); *C08J 5/046* (2013.01); *C08J 5/243* (2021.05); *C08J 5/244* (2021.05); *C08J 5/246* (2021.05); *C08J 5/247* (2021.05); *C08J 5/249* (2021.05); *C08L 23/06* (2013.01); *C08L 23/12* (2013.01); *C08L 23/147* (2013.01); *C08L 77/04* (2013.01); *B29B 9/06* (2013.01);
(Continued)

(58) Field of Classification Search
None
See application file for complete search history.

(56) References Cited

U.S. PATENT DOCUMENTS 5,060,466 A * 10/1991 Matsuda ................ D07B 1/025
  57/12
5,652,041 A * 7/1997 Buerger .................... B32B 5/26
  428/198

(Continued)

OTHER PUBLICATIONS

PCT/US17/27268—International Preliminary Report on Patentability Chapter I—dated Oct. 25, 2018.

(Continued)

*Primary Examiner* — Peter A Salamon
(74) *Attorney, Agent, or Firm* — Mitchell Law PLLC; Matthew W. Mitchell

(57) ABSTRACT

A thermoplastic prepreg is disclosed having fully impregnated filaments. The prepreg is formed by having a plurality of continuous fibers that are substantially oriented in a longitudinal direction, the continuous fibers constituting from about 30 wt. % to about 40 wt. % of the prepreg, a first resinous matrix that contains a first set of one or more thermoplastic polymers and within which the continuous fibers are embedded, wherein the thermoplastic polymers constitute from about 30 wt. % to about 40 wt. % of the prepreg, and a second resinous matrix that contains a second set of one or more thermoplastic polymers, wherein the second set of thermoplastic polymers constitute from about 30 wt. % to about 40 wt. % of the prepreg.

18 Claims, 14 Drawing Sheets

Related U.S. Application Data

(60) Provisional application No. 62/321,364, filed on Apr. 12, 2016, provisional application No. 62/449,462, filed on Jan. 23, 2017, provisional application No. 62/473,468, filed on Mar. 19, 2017.

(51) Int. Cl.

| | |
|---|---|
| *C08L 23/06* | (2006.01) |
| *C08L 23/12* | (2006.01) |
| *C08L 23/14* | (2006.01) |
| *C08L 77/02* | (2006.01) |
| *C08L 77/04* | (2006.01) |
| *B29B 9/06* | (2006.01) |
| *B29K 23/00* | (2006.01) |
| *B29K 67/00* | (2006.01) |
| *B29K 77/00* | (2006.01) |
| *B29K 307/04* | (2006.01) |
| *B29K 309/08* | (2006.01) |
| *B29K 505/10* | (2006.01) |
| *B29K 509/08* | (2006.01) |
| *B29K 509/10* | (2006.01) |

(52) U.S. Cl.
CPC ............... *B29K 2023/0633* (2013.01); *B29K 2023/065* (2013.01); *B29K 2067/003* (2013.01); *B29K 2067/04* (2013.01); *B29K 2077/00* (2013.01); *B29K 2307/04* (2013.01); *B29K 2309/08* (2013.01); *B29K 2505/10* (2013.01); *B29K 2509/08* (2013.01); *B29K 2509/10* (2013.01); *C08J 2323/06* (2013.01); *C08J 2323/12* (2013.01); *C08J 2323/14* (2013.01); *C08J 2367/04* (2013.01); *C08J 2375/04* (2013.01); *C08J 2377/02* (2013.01); *C08J 2377/04* (2013.01); *C08J 2423/06* (2013.01); *C08J 2423/12* (2013.01); *C08J 2423/14* (2013.01); *C08J 2477/02* (2013.01); *C08J 2477/04* (2013.01); *C08L 2205/025* (2013.01); *C08L 2205/03* (2013.01); *C08L 2205/16* (2013.01); *C08L 2207/066* (2013.01)

(56) References Cited

U.S. PATENT DOCUMENTS

| | | | |
|---|---|---|---|
| 10,370,079 B2* | 8/2019 | Restuccia | B64C 1/00 |
| 11,274,184 B2 | 3/2022 | Dyksterhouse | |
| 2006/0049541 A1* | 3/2006 | Sutton | B29C 45/0005 |
| | | | 264/148 |
| 2007/0243368 A1* | 10/2007 | Edwards | B29C 70/523 |
| | | | 428/292.1 |
| 2009/0017301 A1* | 1/2009 | Moireau | C08J 7/08 |
| | | | 428/372 |
| 2009/0092832 A1* | 4/2009 | Moireau | C03C 25/1025 |
| | | | 428/378 |
| 2012/0298403 A1* | 11/2012 | Johnson | H01B 5/105 |
| | | | 174/130 |
| 2013/0136890 A1* | 5/2013 | Maliszewski | B29C 48/0018 |
| | | | 428/113 |
| 2014/0018491 A1* | 1/2014 | Moniruzzaman | C08K 7/06 |
| | | | 524/495 |
| 2019/0127539 A1* | 5/2019 | Dyksterhouse | C08L 23/06 |

OTHER PUBLICATIONS

PCT/US17/27268—WIPO—International Search Report—dated Oct. 19, 2017.
PCT/US17/27268—WIPO—Written Opinion of the International Searching Authority—dated Oct. 19, 2017.

* cited by examiner

BI-POLYMER THERMOPLASTIC

This disclosure relates generally to composite materials, and more particularly to reinforced composite materials having a bi-polymer structure.

BACKGROUND

The statements in this section merely provide background information related to the present disclosure and may not constitute prior art.

Reinforced composite materials (or "prepregs") have conventionally been formed from fibers (e.g., carbon or glass fibers) that are impregnated within either a thermoset or thermoplastic resinous matrix. Thermoset resins (e.g., unsaturated polyester, epoxy and polyimide) or, Thermoplastic Polymers (e.g., polyolefin's, polyesters, polyamide-imid, TPU's, polycarbonates, and other engineering thermoplastic polymers) are often employed as the matrix, particularly in applications requiring a high level of strength.

In the area of thermoplastic composites there are three primary material types (1) a short fiber reinforced thermoplastic; (2) a continuous reinforced thermoplastic; and (3) a long fiber reinforced thermoplastic (LFT). The short fiber reinforced thermoplastic is generally a pellet that has been produced through traditional compounding technology, where a reinforced fiber is added "dry", in a chopped format to a twin screw extruder along with a thermoplastic polymer and additives. This mixture is then extruded into a cord or rod, chilled and then pelletized. These pellets are primarily used in injection molding applications. These pellets allow for flow into complex molding shapes with some enhanced properties due to the fiber addition and additives. The gain in properties however is minimal due to the resulting short fiber length, and therefore the property enhancement achieved by these short fibers is limited.

In comparison, the continuous fiber reinforced thermoplastic product, in the form of thermoplastic composite tapes, are compression or autoclave molded into a thermoplastic composite part. The properties of these parts are derived due to sustainable fiber lengths and controlled orientation of the fibers in the molding process. The molding process however, due to the continuous fiber length is limited to less complex shapes, and usually achieves lower production volumes.

The long fiber thermoplastic composite type was primarily developed to achieve the most beneficial aspects of the two aforementioned processes. The long fiber thermoplastic process produces a pellet where the reinforcing fiber length is the same length as the pellet. These reinforcing fibers have not been degraded in length by a twin screw compounding process. These long fiber thermoplastic composite pellets are produced by pulling a reinforcing strand, continuously, through a molten bath of polymer, where the fiber and polymer distribution is controlled. This strand is then cooled and chopped into a pellet where the fiber length is nominally between ¼" and 1" long. These pellets are sold to, or produced by, a thermoplastic composite molder through several varying processes. Generally, these molding processes feed the pellets into a low sheer, reciprocating and single screw extruder. The resulting extrudate is placed into a mold and then compression molded under very high pressure, into a composite part or article. This resulting part has the benefit of greatly enhanced reinforcement length, which results into a part that has superior modulus and strength, while reducing shrinkage. This process also lends itself to short molding cycles and high production volumes.

Long fiber thermoplastic types are limited by the types of polymers that can be used. The polymers that can be used are limited in choice by their viscosity profiles and the additives are limited to those that do not inhibit the impregnation of the reinforcing fibers. Due to the fact that the polymer is of a low viscosity nature, thus a low molecular weight version of that polymer, is needed to impregnate the reinforced strand. The resulting molded article will be limited in properties due to that impregnation process. Generally, low molecular weight polymers do not have the toughness or impact resistance of their higher molecular weight counter parts, therefore impact resistance is achieved from the resulting fiber length, not the polymer itself. If higher molecular weight polymers are used in the LFT impregnation process the result is slower speeds, lower volumes and poor whet-out of the fiber strand. Hence, the composite part generated from these higher molecular weights would have higher costs, longer mold cycles and "dry" fibers, which would inhibit the mechanical properties. Therefore, there is a need for a composite material and manufacturing process to reduce the aforementioned deficiencies.

In packaging and shipping markets, consumer goods markets, fashion markets, home improvement markets various banding types may be used including straps, ribbons, tapes, straps, bands, ropes, cords, strings, laces, various coilable products, etc., are known and utilized to hold product down during shipping. Various similar products are available on recreational markets including, e.g., braided or woven tie downs from polymer fibers. For heavy-duty applications where high tensile strength is required, steel or metal banding is known. For lighter weight product, plastic banding is often utilized. The various known straps may include some type of mechanical fastener. Known ribbons are generally found within the market of fabrics. They also can include low tensile strength applications such as cinch straps and draw strings. Generally, ribbons tend to decorate, are sewn to or enclosed by another fabric. Known ribbons are woven from cotton, various threads or other fabric material.

Binding products are also known including safety netting, aircraft and marine tie downs, ratchet straps for trucking and marine applications.

In the tape product category, there are 3 primary known forms: (1) an unreinforced tape, containing only resin or polymer designed for sealing or binding envelopes, packages, pallets, etc. such as scotch tape^TM via polymer strapping tape; (2) a "layered" tape having a layer of reinforcing fiber like cotton, polyester, or fiberglass fibers added to increase the tensile properties of the tape where a higher user demand is placed on the performance of the tape or strapping; and (3) a "composite tape". With respect to the "layered" tape category is important to note that the known reinforcements are layered between the resins or polymers used and not encapsulated therein or integrated thereof. The "composite tape" is formed where different reinforcements, such as carbon, aramid, HDPE Fiber and fiberglass, are fully encapsulated in a resinous or polymer matrix. These composite tapes are then layered, in an engineered manner, placed under significant heat and pressure, and molded into parts such as boat hulls, one piece showers, automobile hoods, etc. Because of the expense in making these tapes and the time, temperature and pressure required to make them bond to each other they are unsuitable for sealing or binding applications. All of these known variants of tape requires use of an adhesive to affix them to objects which they are meant to seal, repair, bind etc. The adhesive is a key component of the tape that is required for its functionality and use.

Therefore, it would be advantageous to manufacture a thermoplastic ribbon formable into a braided tube or sleeve, after applying a thermal energy source, that does not require a layer of adhesive for attachment.

SUMMARY

A thermoplastic prepreg and methods for manufacturing same are disclosed. The thermoplastic prepreg includes a plurality of continuous fibers constituting from about 60 wt. % to about 70 wt. % of the prepreg, a first resinous matrix that contains a first set of one or more thermoplastic polymers and within which the continuous fibers are impregnated, wherein the thermoplastic polymers constitute from about 30 wt. % to about 40 wt. % of the prepreg, and a second resinous matrix that contains a second set of one or more thermoplastic polymers, wherein the second set of thermoplastic polymers constitute from about 30 wt. % to about 40 wt. % of the prepreg. This will provide an overall thermoplastic impregnated strand where the continuous fibers account for 30 wt. % to 40 wt. % and the combined two thermoplastic polymer layers constitute for 60 wt. % to 70 wt. % of the overall product. This strand will then typically be pelletized into ⅛" to 1" lengths.

A braided thermoplastic ribbon is disclosed having a substantially impregnated fiber embedded within a resinous matrix.

In various embodiments, the braided thermoplastic ribbon is formed into a tube. The tube may then be heated and formed to an object or partially formed, as desired, as it cools.

In various embodiments, the braided thermoplastic ribbon may be used in medical or dental applications. For example, the braided thermoplastic tube disclosed herein will allow for the use without the need for mechanical fasteners. Since the tube is not tacky at room temperature it can be positioned or repositioned in to the exact manner that is needed. Even after heat has been applied and the products are sealed together then subsequently cooled, as long as a "tag" end remains un-bonded, it can be re-heated and unwound or removed.

In one embodiment, the braided thermoplastic tube, having low temperature, low pressure bonding properties, is formed using a polymer configured to bond primarily with itself.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
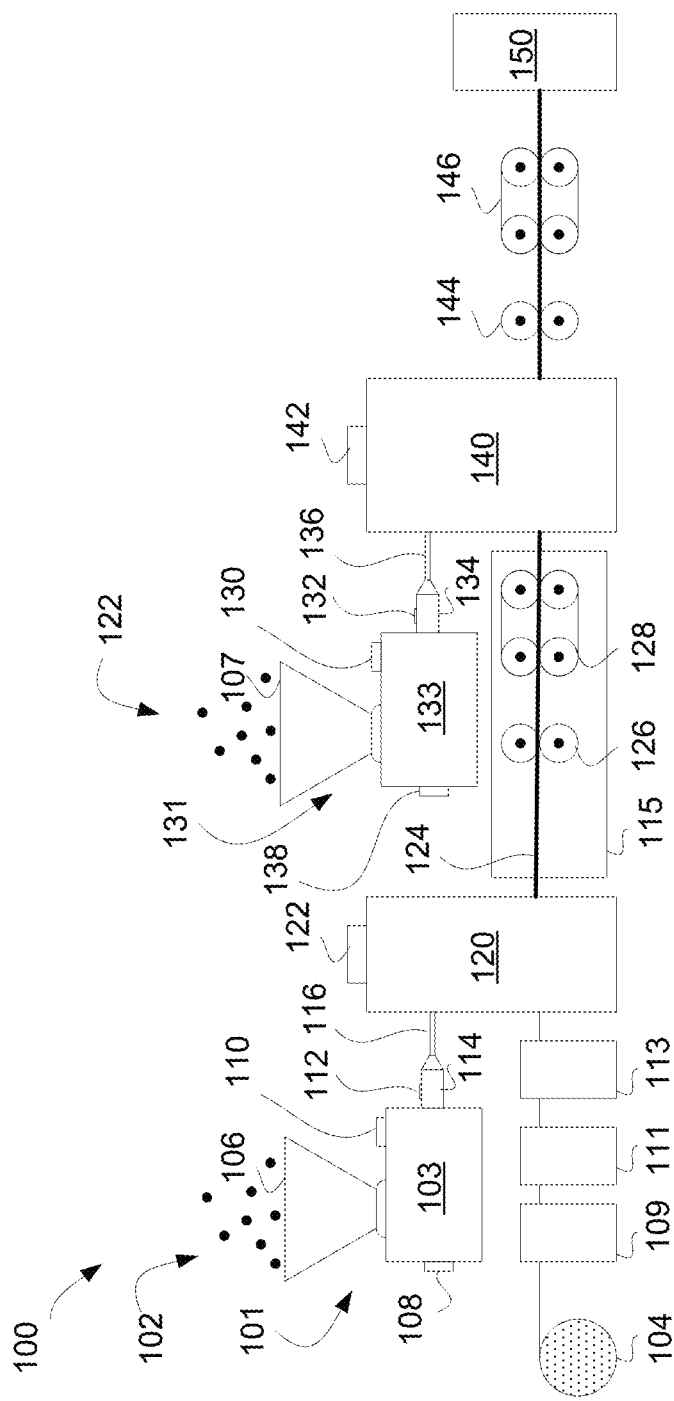
FIG. 1 schematically shows an exemplary impregnation system, in accordance with the present disclosure.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment.

It is to be understood by one of ordinary skill in the art that the present discussion is a description of exemplary embodiments only, and is not intended as limiting the broader aspects of the present disclosure.

Generally, the present disclosure is directed to a prepreg that contains two separate and discrete layers whereas the first layer contains a plurality of unidirectionally aligned continuous fibers embedded within the first polymer. Through such layering, polymer properties of the first and second layers may be augmented, and/or complimented according to an intended application. Although unique polymer combinations and structure are one aspect of the present disclosure, it should be understood that fiber properties, fiber types, and fiber structure may also be adapted. In fact, one notable feature of the present disclosure is the ability to tailor the mechanical properties of the prepreg for an intended application by selectively controlling certain process parameters, such as the type of continuous fibers employed, the concentration of the continuous fibers, along with the thermoplastic resins used for each of the layers.

Various embodiments of the present disclosure will be described in detail with reference to the drawings, where like reference numerals represent like parts and assemblies throughout the several views. Reference to various embodiments does not limit the scope of the disclosure, which is limited only by the scope of the claims attached hereto. Additionally, any examples set forth in this specification are not intended to be limiting and merely set forth some of the many possible embodiments for the claimed disclosure.

The term "continuous fibers" refers to fibers, filaments, yarns, or rovings (e.g., bundles of fibers) having a length that is generally limited only by the length of the part. For example, such fibers may have a length greater than about 25 millimeters, in some embodiments about 50 millimeters or more, and in some embodiments, about 100 millimeters or more. The continuous fibers may be formed from any conventional material known in the art, such as metal fibers; glass fibers (e.g., E-glass, A-glass, C-glass, D-glass, AR-glass, R-glass, S1-glass, S2-glass), carbon fibers (e.g., graphite), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic compositions, e.g., spectra. Glass fibers and carbon fibers are particularly desirable for use in the continuous fibers. Such fibers often have a nominal diameter of about 4 to about 35 micrometers, and in some embodiments, from about 9 to about 35 micrometers. The tow or fibrous bundles must contain untwisted filaments. If desired, the fibers may be in the form of rovings (e.g., bundle of fibers) that contain a single fiber type or different types of fibers. Different fibers may be contained in individual rovings or, alternatively, each roving may contain a different fiber type. For example, in one embodiment, certain rovings may contain continuous carbon fibers, while other rovings may contain glass fibers. The number of fibers contained in each roving can be constant or vary from roving to roving.

The term "long fibers" generally refers to fibers, filaments, yarns, or rovings that are not continuous and have a length of from about 0.5 to about 25 millimeters, in some embodiments, from about 0.8 to about 15 millimeters, and in some embodiments, from about 1 to about 12 millimeters. The long fibers may be formed from any of the material, shape, and/or size as described above with respect to the continuous fibers. Glass fibers and carbon fibers are particularly desirable for use as the long fibers.

Any of a variety of thermoplastic polymers may be employed to form the thermoplastic matrix in which the continuous and long fibers are embedded. Suitable thermoplastic polymers for use in the present disclosure may include, for instance, polyolefins (e.g., polypropylene, propylene-ethylene copolymers, etc.), polyesters (e.g., polybutylene terephalate ("PBT")), polycarbonates, polyamides (e.g., Nylon™) polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS")), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth.

Referring now to the drawings, wherein the depictions are for the purpose of illustrating certain exemplary embodiments only and not for the purpose of limiting the same, FIG. 1 schematically shows an exemplary extrusion system 100. The system 100 includes a first extruder 101 containing a screw shaft 108 mounted inside a barrel 103. A heater 110 (e.g., electrical resistance heater) is mounted outside the barrel 103. During use, a first thermoplastic polymer feedstock 102 is supplied to the extruder 101 through a hopper 106. The feedstock 102 may contain long fibers, may be free of long fibers, and/or such fibers may be supplied at another location (not shown), such as downstream from the hopper 106 and/or other feed ports.

The thermoplastic feedstock 102 is conveyed inside the barrel 103 by the screw shaft 108 and may be heated by frictional forces inside the barrel 103 and by the heater 110. Upon being heated, the feedstock 102 exits the barrel 103 through a barrel flange 114 and enters a die flange 116 of an impregnation die 120, i.e., a melt extrusion die. A continuous fiber roving 105 or a plurality of continuous fiber rovings 105 are supplied from a reel or reels 104 to die 120. The rovings 105 are generally kept apart a certain distance before impregnation, such as at least about 4 millimeters, and in some embodiments, at least about 5 millimeters. In one embodiment, a tension assembly 109 may be utilized to impart a tension upon the rovings 105. The tension assembly 109 may be implemented to provide a tension of an outside pull nature so as to eliminate twist in the rovings 105. Tensioning helps spread the tow to a desirable width to allow impregnation, supplies a desirable force to impregnate any particular resin due to its viscosity and heat stability and finally provides a force that goes into twisting which also aids in removing excess resin and impregnation. This tension applied to the rovings 105 can range from a quarter of a pound to ten pounds of resistance tension placed upon the rovings 105.

In various embodiments, the rovings 105 may be pre-heated in an oven 111 before moved into the die 120. Pre-heating the rovings 105, removes residual moisture from either the rovings 105 or the sizing on the rovings 105. This oven 111 could be set at temperatures anywhere from 200-degrees F. to 800-degrees F., depending on the properties of the particular type of rovings 105, sizing of the rovings 105, and the speed at which the rovings 105 travel through the oven 111. Pre-heating allows for more desirous spreading and adhesion of the matrix resin to the reinforcement surface of the rovings 105. Subsequent or concurrent with pre-heating in the oven 111, the rovings 105 may be spread and pre-heated while traveling within an assembly 113 having alternating pins with radial surfaces that further increase spreading and pre-heat of the rovings 105 at temperatures ranging from 150 F to 850 F depending on the particular type of roving 105.

The feedstock 102 may further be heated inside the die 120 by heaters 122 mounted in or around the die 120. The die 120 is generally operated at temperatures that are sufficient to cause melting and impregnation of the thermoplastic polymer 102. Typically, the operation temperatures of the die 120 is higher than the melt temperature of the thermoplastic polymer. When processed in this manner, the continuous fiber rovings 105 become embedded in the polymer matrix, which may be a resin processed from the feedstock 102. The mixture is then extruded from the impregnation die 120 to create a first extrudate 124.

A pressure sensor 112 may be used to monitor pressure near the impregnation die 120 to allow control to be exerted over the rate of extrusion by controlling the rotational speed of the screw shaft 108, or the feed rate of the feeder. That is, the pressure sensor 112 is positioned near the impregnation die 120 so that the extruder 101 can be operated to deliver a preferable amount of molten polymer for interaction with the fiber rovings 105. In various embodiments, the preferable amount of resin is an amount to sufficient to be equally spread across the rovings 105 at a percentage level that allows for the full covering of the filaments surface within the reinforcement bundle without excess. By only applying a minimum amount at the step, there remains potential for a secondary resin to be applied later to this extrudate 124.

In one embodiment, after leaving the die 120, the extrudate 124 moves through a impregnation die assembly 115 having a series of alternating, heated, impregnation pins. These pins may also have convex and concave surfaces to allow the polymer to move both in an x and y direction for thorough impregnation of the extrudate 124.

In various embodiments, the extrudate 124, or impregnated fiber rovings 105, may then be moved through a cooling a rolling assembly 117 which may include a nip formed between two adjacent rollers 126 to enhance fiber impregnation and squeeze out any excess voids. The resulting consolidated ribbon is pulled by tracks 128 mounted on rollers. The tracks 128 also pull the extrudate 124 from the impregnation die 120 and/or the impregnation die assembly 115 and through the rollers 126. In one embodiment, the extrudate 124 is then twisted into a circular bundle which again aids in further impregnation and takes any excess resin and displaces it to the surface of the bundle. This impregnated cord of reinforcement material may then be chilled to a temperature at which the molten polymer becomes solid.

The system 100 further includes a second extruder 131 containing a screw shaft 138 mounted inside a barrel 133. A heater 130 (e.g., electrical resistance heater) is mounted outside the barrel 133. During use, a second thermoplastic polymer feedstock 122 is supplied to the second extruder 131 through a second hopper 107. The feedstock 122 will contain a secondary polymer that may be the same or different as the primary polymer which could contain any number of additives (e.g., talc, mica, colorant, heat stabilizer, UV stabilizer, EMI shielding, nano-particles, short fibers, recycled material, etc.).

The second thermoplastic feedstock 122 is conveyed inside the barrel 133 by the screw shaft 138 and may be heated by frictional forces inside the barrel 133 and by the heater 130. Upon being heated, the feedstock 122 exits the barrel 133 through a barrel flange 134 and enters a die flange 136 of a closed die 140. The feedstock 122 may further be heated inside the die 140 by heaters 122 mounted in or around the die 120. The die 140 is generally operated at temperatures that are sufficient to cause melting to allow for over coating of the composite strand containing the primary polymer and the continuous filaments. Typically, the operation temperatures of the die 140 is higher than the melt temperature of the second thermoplastic polymer 122. In one embodiment, the operation temperature of the second die 140 is less than a melt temperature of the first thermoplastic polymer 102, but higher that a melt temperature of the second thermoplastic polymer 122. The extrudate 124, from the first die 120 are supplied to the second die 140. The extrudate 124, when processed in this manner, becomes layered with the second polymer matrix, which may include a resin processed from the feedstock 122. The mixture is then extruded from the impregnation die 140 to create a second extrudate 148.

A pressure sensor 132 may be used to monitor pressure near the second impregnation die 140 to allow control to be exerted over the rate of extrusion by controlling the rotational speed of the screw shaft 138, or the feed rate of the feeder. That is, the pressure sensor 132 is positioned near the impregnation die 140 so that the extruder 131 can be operated to deliver a correct amount of resin for interaction with the extrude 124 from the first die 120.

After leaving the second impregnation die 140, the extrudate 148, may enter an optional pre-shaping, or guiding section (not shown) before entering a nip formed between two adjacent rollers 144. Although optional, the rollers 144 can help to consolidate the extrudate 148 into the form of a ribbon (or tape), as well as enhance fiber impregnation and squeeze out any excess voids. In addition to the rollers 144, other shaping devices may also be employed, such as a die system. The resulting consolidated ribbon 149 or cord is pulled by tracks 146 mounted on rollers. The tracks 146 also pull the extrudate 148 containing the continuous filaments from the impregnation die 140 and through the rollers 144. If desired, the consolidated ribbon 149 may be wound up at a section or chopped into LFT pellets in a chopper 150 in lengths ranging from ⅛ of an inch to one-inch-long pellets, but may vary according to preset parameters.

In operation, the first and second polymers, 102 and 122, respectively, may have a same or different chemistry, but may have two differing molecular weights. The first polymer 102 may be selected due primarily to its viscosity, heat stability, sizing adhesion promoters (maleic anhydride) and increased modulus needed to support the reinforcing fiber of a given length. In various embodiments, this first polymer 102 will be of lower molecular weight and have low impact resistance. In various embodiments, the first polymer 102 is selected to have high melt flow or low viscosity, high modulus, optimum heat stability and low melt strength. The additives to the first polymer 102 would contain but not be limited to, chemical additions that enhance the interface and bonding to the reinforcing filaments and chemicals that would affect the crystallinity growth rate of that polymer.

In one embodiment, the reinforcing fiber 104 would be spread into a flat band or rovings 105 through the use of tension and mechanical polished rods or through the use of pressurized air. This reinforcing band 105 may or may not need to be dried before entering a device which would heat the fiber to a desired temperature, this heating process allows for better impregnation of the first polymer 102. Upon exiting the heating process, the reinforcing band of heated fiber would enter either a closed or open die device, e.g., 120 that would allow for the introduction of the impregnation polymer 102. This reinforcement, either coated or surrounded by an impregnation polymer, could then enter a series of pins or rods that would further impregnate the reinforcing fiber strand. In the case of a closed die system, this impregnating tow would either: (1) exit through a sized orifice removing all but 30 to 40% of the polymer from the extrude 124; or (2) in the case of an open die system, only 30 to 40% of the polymer would be added to the fiber and then subsequent pins would allow for further impregnation. Then this impregnated strand will be formed, rolled or twisted into a cylindrical shape while the first polymer 102 is still molten. This strand will preferably, but is not required to be, cooled to a given temperature through the use of air, water or environmental conditions.

Figure 2A:
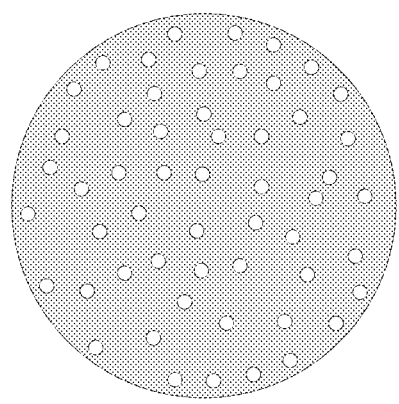
FIG. 2A shows a cross-section of a known reinforced composite material after polymer impregnation.
Figure 2B:
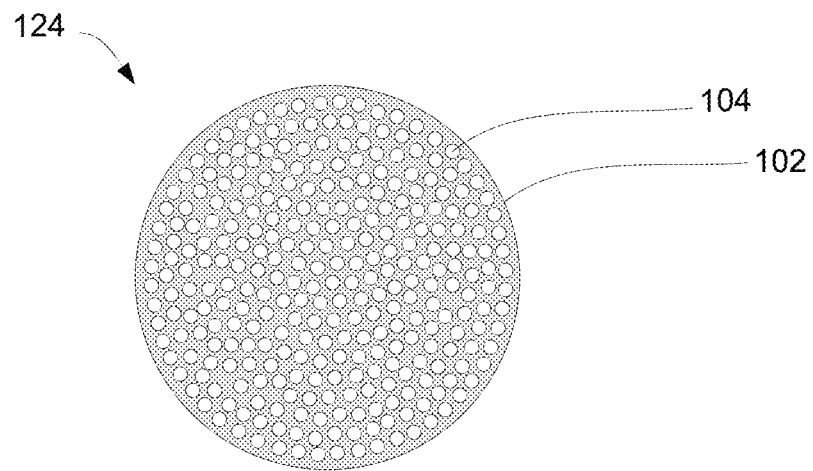
FIG. 2B shows a cross-section of a reinforced composite material after a first stage of polymer impregnation, in accordance with the present disclosure.

An exemplary extrude strand 124 exiting the die 120 is shown in a cross-sectional in FIG. 2B. As FIG. 2B shows, the strand 124 is formed of 30 to 40% of the first polymer 102, and 60% to 70% of the fiber 104. Unlike the known reinforced composite such as shown in FIG. 2A, the fibers 104 are fairly compacted with a minimum polymer 102 impregnated. The known reinforced composite such as shown in FIG. 2A generally have 30% fiber and 70% polymer.

This extrude strand 124 would then enter an over coating die 140 where a secondary polymer 122, including any additives to the polymer 122, would be applied to the exterior surface of the strand 124. This secondary polymer 122 is added to the strand 124 to achieve a percentage that brings the overall strand to a desired fiber/polymer ratio. In one embodiment, this strand 148 is then rapidly cooled and chopped to a desired length. In various embodiments, the second polymer 122 would generally be characterized by having a high molecular weight, low viscosity, superior toughness and any additives that may enhance its physical and chemical characteristics. These additives could include, but are not limited to, talc (cost reduction), mica, colorants, heat stabilizers, UV inhibitors, flame retardants, EMI shielding, recycled polymers, flow enhancers, nano-fill materials, short reinforcing filaments, etc. In various embodiments, the extrude 124 into the second die 140 is formed of a 60% to 70% reinforcing fiber (fiberglass, carbon, aramid, HDPE, etc.), by weight, with little or no voids within the strand. Thereafter, adding a second layer, surrounding the first layer, with a polymer 122 of the aforementioned attributes, inline and uninterrupted to the LFT process, that may produce a bi-polymer LFT pellet.

Figure 2C:
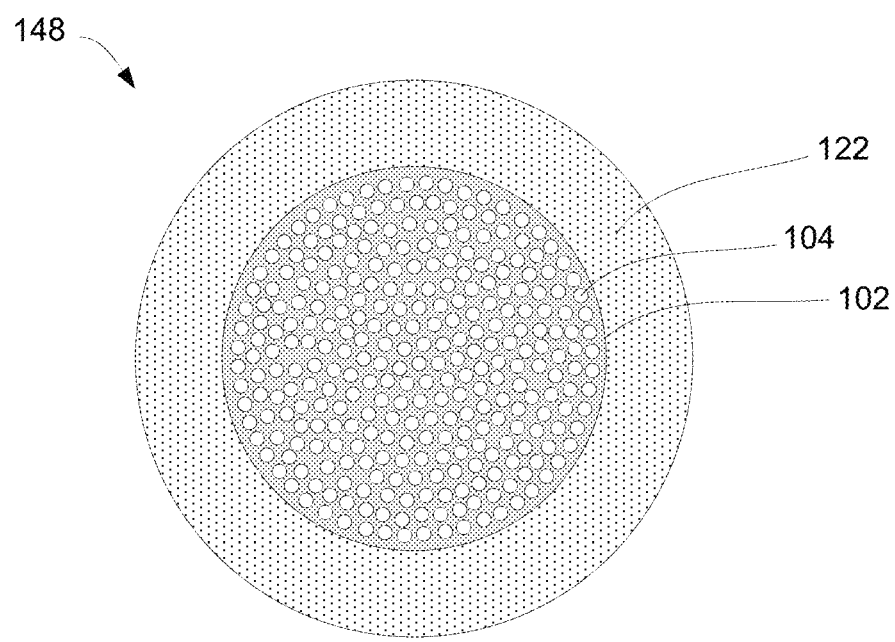
FIG. 2C shows a cross-section of the reinforced composite material after a second stage of polymer impregnation, in accordance with the present disclosure.
Figure 3:
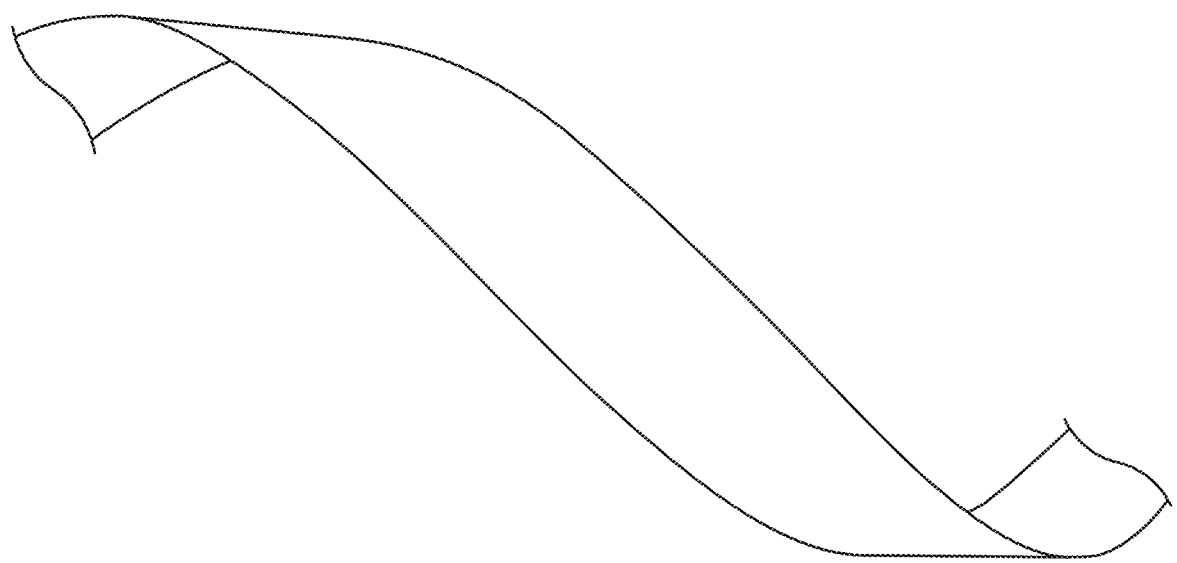
FIG. 3 shows and exemplary thermoplastic ribbon, in accordance with the present disclosure.
Figure 4:
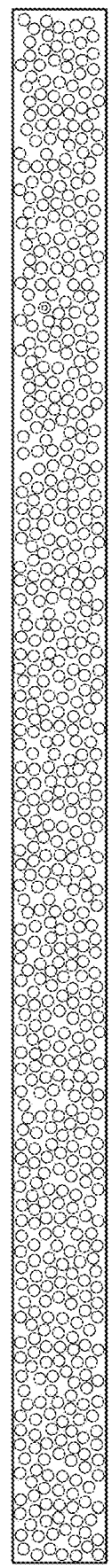
FIG. 4 is a cross-sectional view of the thermoplastic ribbon, in accordance with the present disclosure.
Figure 5A:
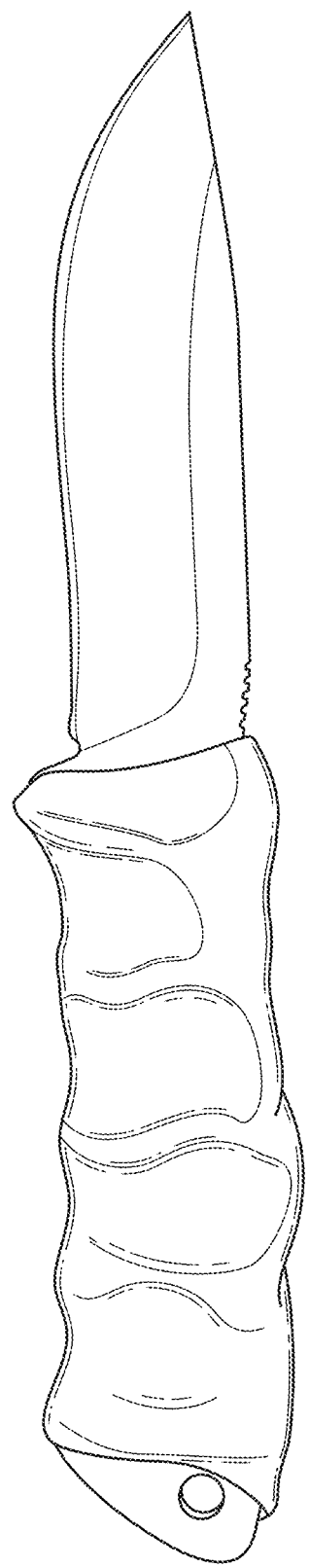
FIGS. 5A-5F show various thermoplastic ribbons and exemplary applications, in accordance with the present disclosure.
Figure 5B:
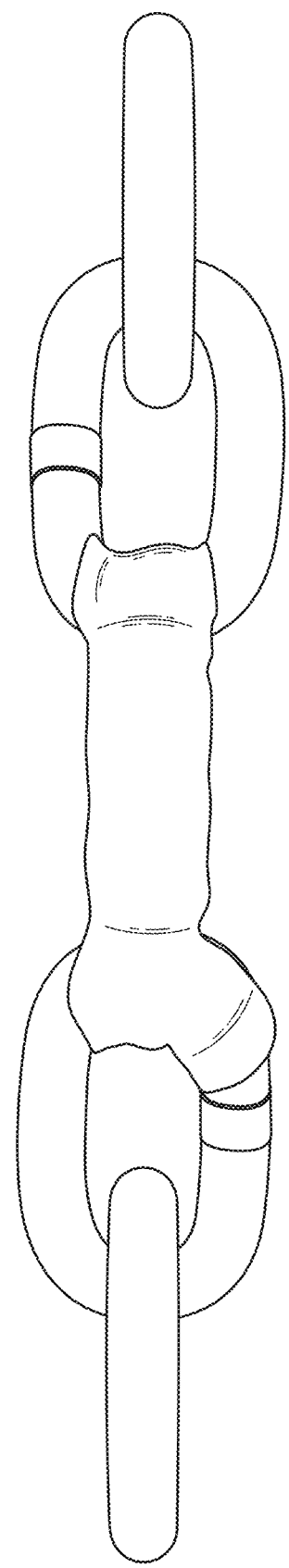
Figure 5C:
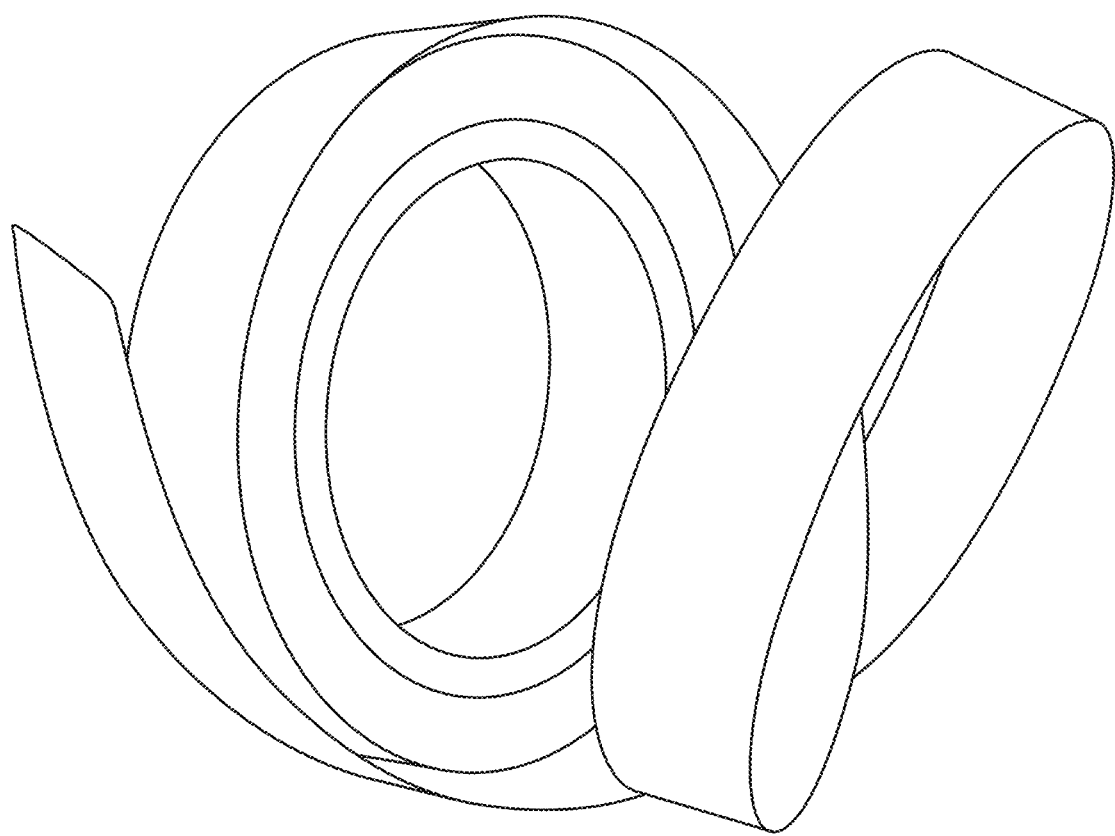
Figure 5D:
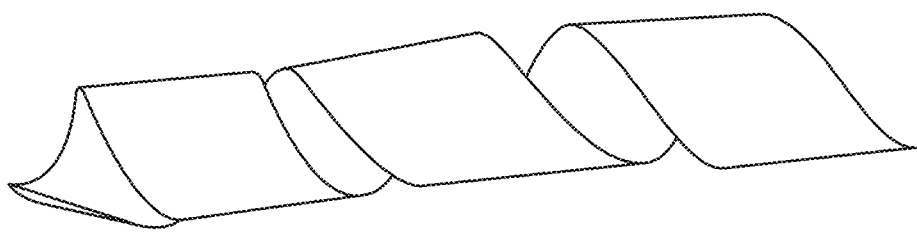
Figure 5E:
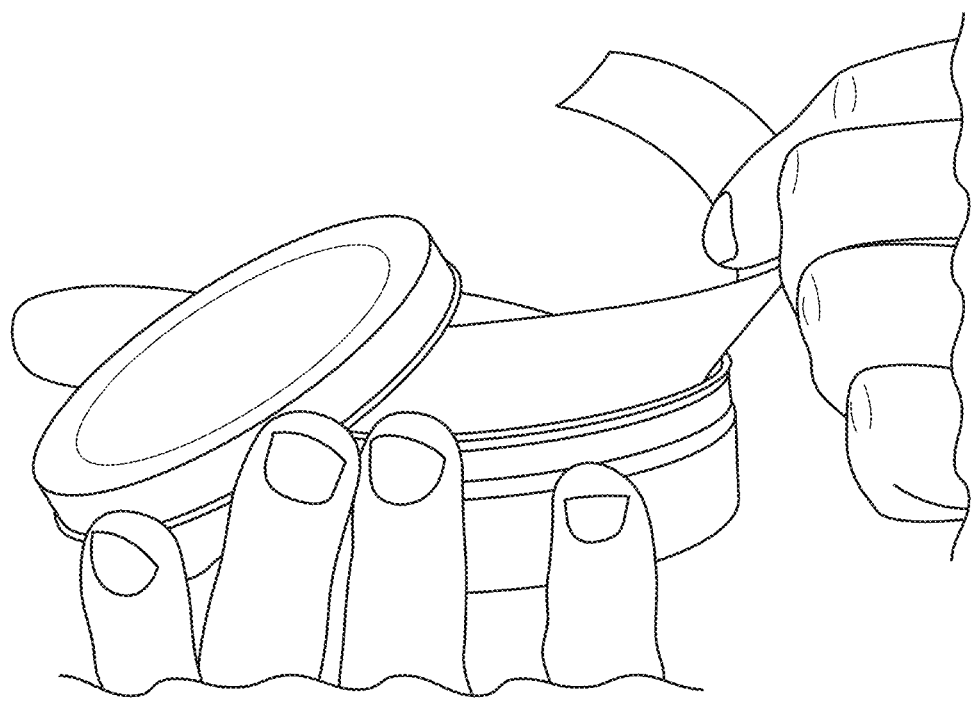
Figure 5F:
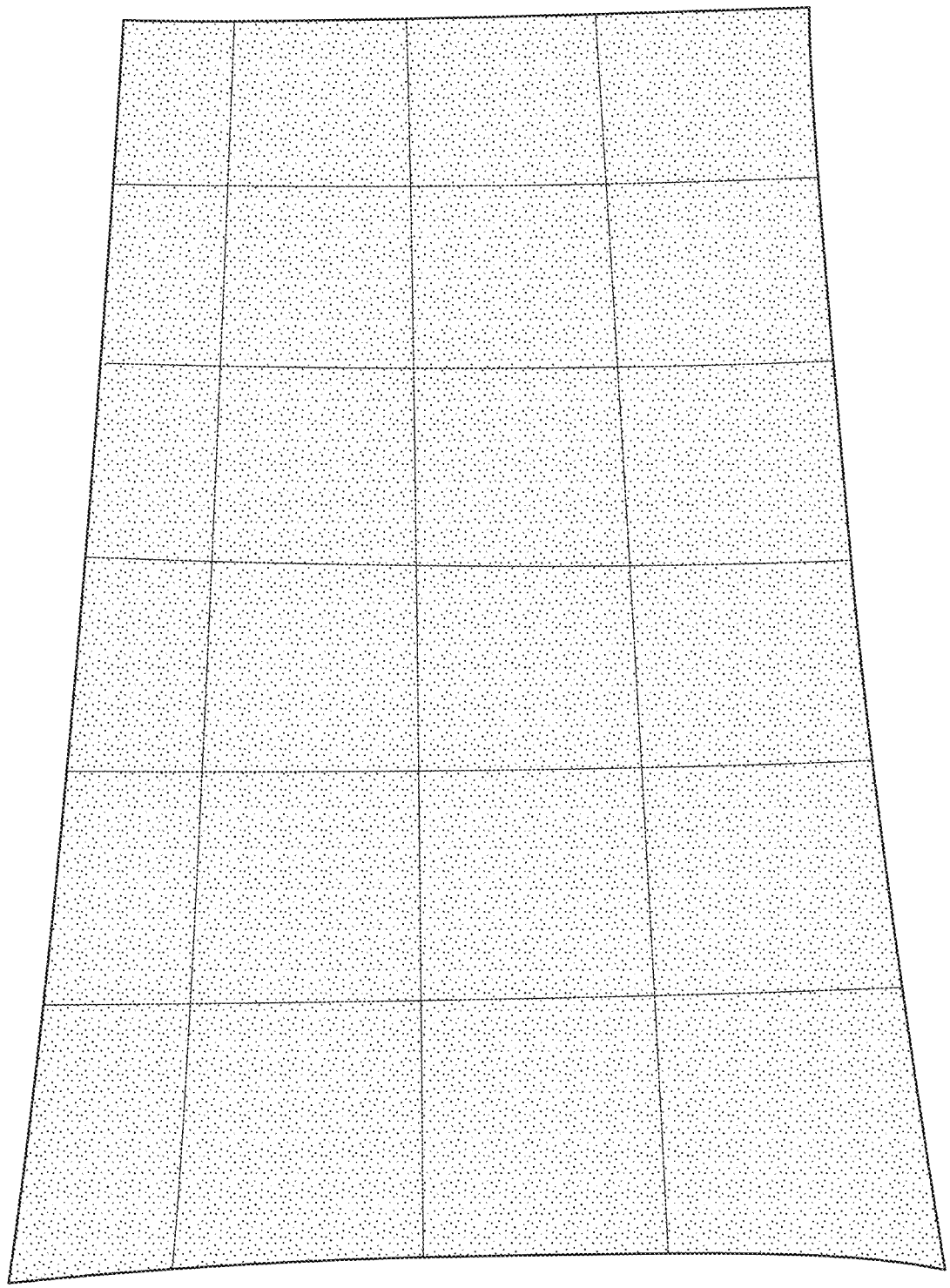

An exemplary extrude strand 148 exiting the die 140 is shown in a cross-sectional in FIG. 2C. As FIG. 2C shows, the strand 148 is formed of a first layer of the extrude strand 124 having 30 to 40% of the first polymer 102, and 60% to 70% of the fiber 104, and then a second layer formed of the second polymer 122, giving the total fiber to polymer ratio between 30/70-40/60.

In one embodiment, due to the fully impregnated nature of the initial reinforcing strand with the initial polymer 102, the secondary polymer 122 cannot displace the initial polymer 102 from the reinforcing strand. This initial polymer 102 then has a dominant effect on modulus and filament adhesion, having a positive effect on the production speed of the process and the overall properties of the composite parts being molded. The secondary resin, although minimally affected by the properties of the initial resin, could also be tailored to effect the desired properties, performance and cost of the final composite article. In various embodiments, the extrude 124 is fully or near fully whet-out, so that the initial polymer 102 or the secondary polymer 122 cannot impede either polymers performance. Thereafter, strands from the reel 150 can enable subsequent products to be configured to allow the tailoring or "alloying" of specific composite properties that cannot be achieved through a traditional LFT process.

In various embodiments, the resulting consolidated ribbon 149 may be cooled and chopped into pellets having a length of about 1" or less.

The prepreg of the present disclosure may generally be used in a variety of different applications and parts. For example, the prepreg may be formed into a profile, injection molded part, compression molded, part, etc. A "profile" is hollow or solid pultruded part that may possess a wide variety of cross-sectional shapes, such as square, rectangular, circular, elliptical, triangular, I-shaped, C-shaped, U-shaped, J-shaped, L-shaped, slotted, etc. In hollow profiles, at least a portion of the interior of the profile is a voided space. The voided space may optionally extend the entire the length of the profile. The profiles may also be "lineal" to the extent that they possess a cross-sectional shape that is substantially the same along the entire length of the profile, or they may have a varying cross-sectional shape, such as curved, twisted, etc.

The manner in which a profile may be formed from a prepreg can vary as is well known to those skilled in the art. One or multiple prepreg layers may be employed for forming the profile. For example, one particular embodiment of a system is shown in which a plurality of prepregs are employed to form a profile. In this embodiment, the prepregs are provided in a wound package on a creel. The creel may be an unreeling creel that includes a frame provided with horizontal rotating spindles, each supporting a package. A pay-out creel may also be employed, particularly if desired to induce a twist into the fibers. It should also be understood that the prepregs may also be formed in-line with the formation of the profile. In one embodiment, for example, the extrudate 148 exiting the impregnation die 148 from FIG. 1 may be directly supplied to the system used to form a profile.

A tension-regulating device may also be employed to help control the degree of tension. The device may include inlet plate that lies in a vertical plane parallel to the rotating spindles of the creel. The tension-regulating device may contain cylindrical bars arranged in a staggered configuration so that the prepregs pass over and under these bars to define a wave pattern. The height of the bars can be adjusted to modify the amplitude of the wave pattern and control tension.

If desired, the prepregs may be heated in an oven having any of a variety of known configuration, such as an infrared oven, convection oven, etc. During heating, the fibers are unidirectionally oriented to optimize the exposure to the heat and maintain even heat across the entire profile. The temperature to which the ribbons are heated is generally high enough to soften the thermoplastic polymer to an extent that the ribbons can bond together. However, the temperature is not so high as to destroy the integrity of the material.

Upon being heated, the continuous fiber ribbons may be provided to a consolidation die to help bond together different ribbon layers, as well as for alignment and formation of the initial shape of the profile. Although referred to herein as a single die, it should be understood that the consolidation die may in fact be formed from multiple individual dies (e.g., face plate dies). The consolidation die may receive the prepregs so that it is guided through a channel of the die in a direction. The channel may be provided in any of a variety of orientations and arrangements to result in the desired reinforcement scheme. Within the die, the prepregs are generally maintained at a temperature at or above the melting point of the thermoplastic matrix used in the ribbon to ensure adequate consolidation.

If desired, a pultrusion die may also be employed that compresses the prepregs into the final shape for the profile. The configuration of the die depends on the desired shape and properties for the resulting profile. To form hollow profiles, the pultrusion die typically contains a mandrel within its interior so that the fiber material flows between the interior surface of the die and the external surface of the mandrel to form the desired shape. Further, although referred to herein as a single die, it should be understood that the pultrusion die may be formed from multiple individual dies.

One or multiple layers may be employed for forming the profile. In one embodiment, for example, multiple layers are employed and initially spaced apart from each other in the vertical direction, e.g., a plurality of strands such as shown in FIG. 2C stacked upon one another or adjacent thereto. As they pass through respective channels of the consolidation die, the widths of the layers are optionally ribboned to help prevent pressure wedges, and to keep the continuous fibers aligned and twist-free. Although not specifically shown, a mandrel may also be provided in the interior of the consolidation die to help guide the layers into contact with each other on at least one side of the profile. For example, one side of a prepreg layer and a side of another prepreg layer may be angled so that they contact each other and form a side of a hollow profile. The other side of the profile is, however, typically left open within the consolidation die so that the long fiber material can be subsequently applied to the interior of the profile in the pultrusion die. When in the desired position, the prepreg layers are pulled into a pultrusion die as described above.

If desired, the resulting profile may also be applied with a capping layer to enhance the aesthetic appeal of the profile and/or protect it from environmental conditions. For example, such a capping layer may be applied via an extruder oriented at any desired angle to introduce a thermoplastic resin into a capping die. The resin may contain any suitable thermoplastic polymer known in the art that is generally compatible with the thermoplastic polymer used to form the profile. Suitable capping polymers may include, for instance, acrylic polymers, polyvinyl chloride (PVC), polybutylene terephthalate (PBT), ABS, polyolefins, polyesters, polyacetals, polyamids, polyurethanes, etc. Although the capping resin is generally free of fibers, it may nevertheless contain other additives for improving the final properties of the profile. Additive materials employed at this stage may include those that are not suitable for incorporating into the continuous fiber or long fiber layers. For instance, it may be desirable to add pigments to the composite structure to reduce finishing labor of shaped articles, or it may be desirable to add flame retardant agents to the composite structure to enhance the flame retarding features of the shaped article. Because many additive materials are heat sensitive, an excessive amount of heat may cause them to decompose and produce volatile gases. Therefore, if a heat sensitive additive material is extruded with an impregnation resin under high heating conditions, the result may be a complete degradation of the additive material. Additive materials may include, for instance, mineral reinforcing agents, lubricants, flame retardants, blowing agents, foaming agents, ultraviolet light resistant agents, thermal stabilizers, pigments, and combinations thereof. Suitable mineral reinforcing agents may include, for instance, calcium carbonate, silica, mica, clays, talc, calcium silicate, graphite, calcium silicate, alumina trihydrate, barium ferrite, and combinations thereof.

While not shown in detail herein, the capping die may include various features known in the art to help achieve the desired application of the capping layer. For instance, the capping die may include an entrance guide that aligns the incoming profile. The capping die may also include a heating mechanism (e.g., heated plate) that pre-heats the profile before application of the capping layer to help ensure adequate bonding.

Following optional capping, the shaped part may be supplied to a cooling system as is known in the art. The cooling system may, for instance, be a vacuum sizer that includes one or more blocks (e.g., aluminum blocks) that completely encapsulate the profile while a vacuum pulls the hot shape out against its walls as it cools. A cooling medium may be supplied to the sizer, such as air or water, to solidify the profile in the correct shape.

Following optional capping, the shaped part is then finally cooled using a cooling system as is known in the art. The cooling system may, for instance, be a vacuum sizer that includes one or more blocks (e.g., aluminum blocks) that completely encapsulate the profile while a vacuum pulls the hot shape out against its walls as it cools. A cooling medium may be supplied to the sizer, such as air or water, to solidify the profile in the correct shape.

Vacuum sizers are typically employed when forming the profile. Even if a vacuum sizer is not employed, however, it is generally desired to cool the profile after it exits the capping die (or the consolidation or calibration die if capping is not applied). Cooling may occur using any technique known in the art, such a vacuum water tank, cool air stream or air jet, cooling jacket, an internal cooling channel, cooling fluid circulation channels, etc. Regardless, the temperature at which the material is cooled is usually controlled to achieve optimal mechanical properties, part dimensional tolerances, good processing, and an aesthetically pleasing composite. For instance, if the temperature of the cooling station is too high, the material might swell in the tool and interrupt the process. For semi-crystalline materials, too low of a temperature can likewise cause the material to cool down too rapidly and not allow complete crystallization, thereby jeopardizing the mechanical and chemical resistance properties of the composite. Multiple cooling die sections with independent temperature control can be utilized to impart the optimal balance of processing and performance attributes. In one particular embodiment, for example, a vacuum water tank is employed that is kept at a preset temperature range.

As will be appreciated, the temperature of the profile as it advances through any section of the system of the present invention may be controlled to yield optimal manufacturing and desired final composite properties. Any or all of the assembly sections may be temperature controlled utilizing electrical cartridge heaters, circulated fluid cooling, etc., or any other temperature controlling device known to those skilled in the art.

In various embodiments, a pulling device is positioned downstream from the cooling system that pulls the finished profile through the system for final sizing of the composite. The pulling device may be any device capable of pulling the profile through the process system at a desired rate. Typical pulling devices include, for example, caterpillar pullers and reciprocating pullers. If desired, one or more calibration dies (not shown) may also be employed. Such dies contain openings that are cut to the exact profile shape, graduated from oversized at first to the final profile shape. As the profile passes therethrough, any tendency for it to move or sag is counteracted, and it is pushed back (repeatedly) to its correct shape. Once sized, the profile may be cut to the desired length at a cutting station (not shown), such as with a cut-off saw capable of performing cross-sectional cuts.

As will be appreciated, the particular profile embodiment described above is merely exemplary of the numerous designs that are made possible by the present invention. Among the various possible profile designs, it should be understood that additional layers of continuous and/or long fiber material may be employed in addition to those described above.

Example 1: PPG 113-4589 fiberglass roving was used as a reinforcement strand in this example. The strand was tensioned to 2.7 lbs., spread, dried at 450 degrees Fahrenheit and then subsequently heated to 550 degrees Fahrenheit before entering an open film die for impregnation. A Braskem T12900C high crystallinity co-polymer polypropylene with 2.5% maleic anhydride was selected as the initial impregnation polymer for this bi-polymer LFT process. This polymer was selected because of its high crystallinity, high molecular weight EPR phase and very high flexural modulus, while having 110 MFI which would allow for high speed impregnation. 30% of this matrix polymer was added to the strand. This strand was then introduced to eight heated impregnation pins (520° F.). This thoroughly impregnated heated strand then enters a canted roll system which twists the fiber into a round cord like orientation. This twisting process will also increase fractionally, the length of the fiber in respect to the overall length of the final pellet. This strand is air cooled to roughly 200° F. This strand is then pulled through a ⅛" overcoat die where a Braskem Inspire 404 performance polypropylene polymer filled with 5% carbon black colorant is wire coated on the surface. This bi-polymer LFT pellet now contains a 30% overall fiber content. This strand still moving at 150 fpm is then water cooled and chopped into W' lengths.

Example 2: TORAY T300 24K carbon fiber roving was used as a reinforcement strand in this example. The strand was tensioned to 3.2 lbs., spread, dried at 450 degrees Fahrenheit and then subsequently heated to 600 degrees Fahrenheit before entering an open film die for impregnation. A BASF Ultramid 8202HS high melt flow, modified crystallinity nylon 6 was selected as the initial impregnation polymer for this bi-polymer LFT process. This polymer was selected because of its viscosity, heat stabilized and high process ability. 40% of this matrix polymer was added to the strand. This strand was then introduced to eight heated impregnation pins (545° F.). This thoroughly impregnated heated strand then enters a canted roll system which twists the fiber into a round cord like orientation. This twisting process will also increase fractionally, the length of the fiber in respect to the overall length of the final pellet. This strand is air cooled to roughly 300° F. This strand is then pulled through a ⅛" overcoat die where a BASF Ultramid BU501 extremely tough nylon 6 with high heat and chemical resistance, in addition to low temperature performance, filled with 5% carbon black colorant is wire coated on the surface. This bi-polymer LFT pellet now contains a 30% overall fiber content. This strand still moving at 40 fpm is then air cooled and chopped into W' lengths.

Example 3: DuPont Kevlar 9000 tex aramid yarn roving was used as a reinforcement strand in this example. The strand was tensioned to 4.5 lbs., spread, dried at 200 degrees Fahrenheit and then subsequently heated to 400 degrees Fahrenheit before entering an open film die for impregnation. A Grilamid TR amorphous polyamide 12 resin was selected as the initial impregnation polymer for this bi-polymer LFT process. This polymer was selected because of its amorphous nature, which provides excellent adhesion to the fiber interface, adhesion to the polymer is a typical problem with aramid fibers. 60% of this matrix polymer was added to the strand.

This strand was then introduced to eight heated impregnation pins (450° F.). This thoroughly impregnated heated strand then enters a canted roll system which twists the fiber into a round cord like orientation. This twisting process will also increase fractionally, the length of the fiber in respect to the overall length of the final pellet. This strand is air cooled to roughly 200° F. This strand is then pulled through a ⅛" overcoat die where a Grilamid L polyamide 12 is wire coated on the surface. This bi-polymer LFT pellet now contains a 20% overall fiber content. This strand still moving at 140 fpm is then air cooled to 200 degrees Fahrenheit and chopped into W' lengths.

Example 4: Spectra 5900-5600 denier fiber roving was used as a reinforcement strand in this example. The strand was tensioned to 5 lbs., spread, dried at less than 150 degrees Fahrenheit and then subsequently heated to 180 degrees Fahrenheit before entering an open film die for impregnation. A Dow LDPE 9595 was selected as the initial impregnation polymer for this bi-polymer LFT process. This polymer was selected because of its 50 MFI and melt temperatures of 230 degrees Fahrenheit which is 90 degrees Fahrenheit less than the melting point of the fiber itself. 20% of this matrix polymer was added to the strand.

This strand was then introduced to eight heated impregnation pins (240° F.). This thoroughly impregnated heated strand then enters a canted roll system which twists the fiber into a round cord like orientation. This twisting process will also increase fractionally, the length of the fiber in respect to the overall length of the final pellet. This strand is air cooled to roughly 100° F. This strand is then pulled through a ⅛" overcoat die where a Dow LDPE 1SOE is wire coated on the surface. This polymer was chosen for its high elongation to break, extreme toughness and extremely low MFI. This fractional melt flow LDPE combined with the spectra fibers produces an extremely tough, ballistic resistant, cut resistant and low temperature moldable composite article. This bi-polymer LFT pellet now contains a 50% overall fiber content. This strand still moving at 150 fpm is then air cooled and chopped into W' lengths.

Example 5: PPG 113/4588 E-glass fiber roving was used as a reinforcement strand in this example. The strand was tensioned to 2.7 lbs., spread, dried at 450 degrees Fahrenheit and then subsequently heated to 550 degrees Fahrenheit before entering an open film die for impregnation. A Braskem T12900C high crystallinity co-polymer polypropylene with 2.5% maleic anhydride blended at 80% with 20% TOPAS 6017, was selected as the initial impregnation polymer for this bi-polymer LFT process. This polymer and additives were selected because of its modulus enhancement to polyolefin resins. 30% of this matrix polymer was added to the strand. This strand was then introduced to eight heated impregnation pins (520° F.). This thoroughly impregnated heated strand then enters a canted roll system which twists the fiber into a round cord like orientation. This twisting process will also increase fractionally, the length of the fiber in respect to the overall length of the final pellet.

This strand is air cooled to roughly 200° F. and then pulled through a ⅛" overcoat die where a Braskem Inspire 404 performance polypropylene polymer filled with 5% carbon black colorant is wire coated on the surface. This hi-polymer LFT pellet now contains a 30% overall fiber content. This strand still moving at 150 fpm is then air cooled and chopped into W' lengths. This final polymer when molded compared to example one will exhibit ten to fifteen percent higher modulus due to the fact that the first polymer was designed as a polymer that would better adhere to the filament surface, thus supporting the filament better and increasing modulus.

In one exemplary process for manufacturing a thermoplastic ribbon, the system 100 is modified so that the finished ribbon is completed after the tracks 128. In this modified system, a second resinous matrix is not produced. Hence, the second extruder 131 and the die 140 are unnecessary and may be excluded along with the supporting elements. The process beings by presetting various operating parameters, thermoplastic ribbon specifications preset; and selected material including the selected reinforcing filament and polymer is loaded or otherwise readied.

Fibers may be selected for desired strength, ductility, abrasion resistance, elongation to break or the combination thereof that will be used as the strengthening filaments of the ribbon product itself. In some embodiments, the reinforcing filament should be untwisted and minimally mingled together. The filament should have melting points, degradation points or flammability points, above 160 F. For example, products that requires high modulus (stiffness), e.g., ladies toe caps or heel reinforcements, carbon would be a good choice. In another example, products where a high tensile strength and high ductility is desirous, e.g., products used for strapping or banding packages together, a fiber such as Spectra 1000 (Highly elongated HDPE) may be desirous. In another example, products where a high tensile strength and high ductility along with a higher temperature requirement are desirous, e.g., toe caps for industrial work boots, fibers such as an aramid or para-aramid fiber could be used. These embodiments may also be desirous when cut resistances and adhesion to the leather would be important. In another example, products where a low cost, high strength and high modulus system is desirous, fiberglass reinforcing filaments could be used, such as, e.g., in boat repairs or adhering layers of wood together.

A thermoplastic polymer may be selected to meet the low temperature melting demands and desired adhesion characteristics that are needed in the final ribbon product. One or more polymers are selected from two broad, general categories: (1) polymers that will not adhere or bond to other substrates but will adhere or bond to itself, e.g., Perstorp Capa 6400; and (2) a polymer system that would primarily bond to other substrates. Both polymer types preferably become melted and tacky between room temperature and 230 degrees F. In this way, the user can deploy the ribbon in his or her specific application, using hot water, a hair dryer or heat gun, an air activated thermal pack, ultrasonic or microwave to heat and activate the ribbon product without getting burnt.

Polymers that will not adhere or bond to other substrates but will adhere or bond to itself may be used in binding, tying, plugging and fastening systems together. Perstorp Capa 6400, for example, is a linear polyester derived from caprolactone monomer that may be used in some embodiments.

Polymers that would primarily bond to other substrates may include Covestro Desmomelt 530/540 (a flexible thermoplastic polyurethane). This would provide excellent adhesion to the reinforcing filaments as well as provides outstanding adhesion to a large number of materials, including leather, textiles, wood, metals, etc. These products would primarily be used in bonding applications where adhesion to the substrate you are repairing or bonding is needed.

Subsequent to selection of the fiber and the polymer, the process will be the combining of the selected thermoplastic polymer and reinforcing fiber, in such a way that they are uniformly and intimately dispersed within one another.

In one exemplary operation, a user either inputs a desired number of rovings or tows for a preferred width or thickness of the ribbon, or, in one embodiment, inputs a preferred width or thickness of the ribbon. Generally, reinforcing fibers are provided in bands, tows or rovings containing multiple filaments. Subsequent to selecting a fiber type, the system determines the number of rovings or tows that will be desired to give the final tape its desired width and thickness. Generally, these tows or rovings come on bobbins, which usually contain several thousand yards of fiber. This selected number of rovings on their bobbins are then loaded onto a creel system that allows them to be removed without adding twist to the fiber while under tension.

These fibers are then run through a serious of alternating, polished pins or rods that have the effect of flattening and spreading these roving bundles to a desired width and thickness. This band, containing multiple rovings, is then drawn over heated pins that heat this band to the molten temperature of the resin being applied. At this point, this heated tensioned band, then has a molten stream of resin applied to the top, bottom or both sides of this band to a desired and calculated amount, usually based on weight percentages or volumes. This band will then carry this resin forward through a series of heated polished pins that will allow for the molten polymer to be worked intimately and dispersed intimately throughout the reinforcing filaments contained within each separate roving. Through the last few of these heated pins, this molten polymer heated band is drawn through a slot that sets its exterior dimensions. After exiting this slot, it immediately goes over one or more chill rollers that also contains a dimensional slot and the resin is cooled and the band becomes non-tacky, entering the pull rolls. The pull rolls are responsible for pulling the band through the process and setting the ultimate processing speed. After leaving the pull rolls this cooled band of fiber and resin is then capable of being "Pancake" wound, onto master reels or spools. Any band width can be created through the design of the machinery. In one embodiment, bands wider than 48" can be created by seaming two tapes together by the use of heat and pressure.

Example A: For this example a Dyneema SK75 Dtex 2640 HDPE roving was selected along with a Perstorp CAPA 6400 a high molecular weight linear polyester derived from caprolactone monomer. Six ends of this reinforcing fiber were loaded on to a creel and 1.5 lbs. of tension was applied to each roving. These fibers were then drawn across a series of heated pins spreading them to 1.5" in width and heating them to 150 degrees Fahrenheit. At this point they were introduced to a CAPA 6400 polymer stream, applying enough polymer to the top surface of this heated band of reinforcing fiber at a rate to give the final impregnated tape a 50% by weight fiber, 50% by weight polymer, fully impregnated system. These impregnated tows were drawn across several heated pins in which the polymer was uniformly dispersed amongst all of the fiber filaments. Once this tow bundle was determined to be fully impregnated, it was narrowed down to a width of 1" and a thickness of 0.015". The fiber was then introduced to two more pins, uniformly setting these dimensions. Once these dimensions were set this "hot" impregnated tape was introduced to two alternating chilled rolling cylinders, each with a 15/16" groove, to set a width that when introduced to four more alternating cylinders allowed the tow to spread to 1" in width. This chilled, impregnated ribbon was then taken up on master spools. These spools were then removed and placed on packaging equipment, of which spools of ribbon were produced to a given length. These spools may be sold as a retail package into a broad range of markets including but not limited to sporting goods, camping, medical, dental, home improvement, plumbing, shoe/apparel, ladies undergarments, animatronics/robotics, orthotics and prosthetics, general repairs, boating and marine etc.

The unique feature of these substantially impregnated tapes is that when they are re-heated to 140 degrees Fahrenheit and placed in full contact with another ribbon of the same chemistry, not necessarily the same size or dimension, and then cooled to room temperature they form a single unit or structure with no discernable unit separation. They form a single homogeneous part in any number of multiple units. When two ribbons are heated, applied in full contact with one another and cooled under contact, the mechanical properties are at least twice the mechanical properties of a single unit. Physical separation back into two units is difficult unless 138 degrees Fahrenheit in temperature is reapplied. They can be molded and fashioned an innumerable amount of time, using this heating and cooling scenario. A single band, looped upon itself, with an overlap of 1", under these molding conditions and cooled, exhibited 26,000 psi in tensile strength. The tensile strength can be varied by simple adding or decreasing the number of rovings placed within the product and altering the resin flow to a given percentage.

Example B: Using the spooled ribbons from example A, these spools of ribbons were placed in a Dornier Tape Rapier Weaving Machine Type P1 Model PTST 2/E D4 25/40. This will produce a 48" wide/1" standard woven product. This product was then taken up on spools 48" wide. These may or may not be taken to a double Teflon belt laminator, heated to 150 degrees Fahrenheit, traveling at 10 ft/min, applying 10 psi. of pressure, then immediately leaving the heated zone into a room temperature zone where the product is cooled to 80 degrees Fahrenheit. This product was then taken up on spools and could then be shipped for customers. One of many applications for this unique material would be the ability to construct a multiple ply moldable ballistic vest that is capable of being custom fit to the military, law enforcement or security personnel that it is intended to protect. Other customizable ballistic components can also be fashioned or molded to fit arms, legs, neck, groin, or any other areas on the human body. A Second application could be simply molding multiple ply's to construct or produce athletic padding across a wide range of sports and activities. A third example would be taking multiple ply's of this material and molding it into a nonmetallic safety toe cap for the boot and shoe industry. A fourth example would be selling this material into a sheet form to the broad consumer industry including but not limited to sporting goods, camping, medical, dental, home improvement, plumbing, shoe/apparel, ladies undergarments, animatronics/robotics, orthotics and prosthetics, general repairs, boating and marine etc.

Example C: For this example a Dyneema SK75 Dtex 2640 HDPE roving was selected along with a Perstorp Capa 6400 a high molecular weight linear polyester derived from caprolactone monomer. An adhesion promoter such as Capa 8502A or the Bayer Desmomelt system will be added at a given percentage from 1-99% by weight to the base polymer. These additives are added to the base polymer to provide adhesion not only to themselves but to a base substrate that may be incompatible with the base polymer. Such as taking either the tapes or the woven tapes and repairing a polyethylene canoe or kayak of which the base polymer would be incapable of doing without the adhesion promoters. Six ends of this reinforcing fiber were loaded on to a creel and 1.5 lbs. of tension was applied to each roving. These fibers were then drawn across a series of heated pins spreading them to 1.5" in width and heating them to 150 degrees Fahrenheit. At this point they were introduced to a CAPA 6400 polymer stream, applying enough polymer to the top surface of this heated band of reinforcing fiber at a rate to give the final impregnated tape a 50% by weight fiber, 50% by weight polymer, fully impregnated system. These impregnated tows were drawn across several heated pins in which the polymer was uniformly dispersed amongst all of the fiber filaments. Once this tow bundle was determined to be fully impregnated, it was narrowed down to a width of 1" and a thickness of 0.015". The fiber was then introduced to two more pins, uniformly setting these dimensions. Once these dimensions were set this "hot" impregnated tape was introduced to two alternating chilled rolling cylinders, each with a 15/16" groove, to set a width that when introduced to four more alternating cylinders allowed the tow to spread to 1" in width. This chilled, impregnated ribbon was then taken up on master spools. These spools were then removed and placed on packaging equipment, of which spools of ribbon were produced to a given length and then could be distributed to customers. These spools could be sold as a retail package into a broad range of markets including but not limited to sporting goods, camping, medical, dental, home improvement, plumbing, shoe/apparel, ladies undergarments, animatronics/robotics, orthotics and prosthetics, general repairs, boating and marine etc.

One unique feature of these substantially impregnated tapes is that when they are re-heated to 140 degrees Fahrenheit and placed in full contact with another ribbon of the same chemistry, not necessarily the same size or dimension, and then cooled to room temperature they form a single unit or structure with no discernable unit separation. They form a single homogeneous part in any number of multiple units. When two ribbons are heated, applied in full contact with one another and cooled under contact the mechanical properties are twice the mechanical properties of a single unit. Physical separation back into two units is difficult unless 138 degrees Fahrenheit in temperature is reapplied. They can be molded and fashioned an innumerable amount of time, using this heating and cooling scenario. A single band, looped upon itself, with an overlap of 1", under these molding conditions and cooled, exhibited 26,000 psi in tensile strength. The tensile strength can be varied by simple adding or decreasing the number of rovings placed within the product and altering the resin flow to a given percentage.

Example D: Using the spooled ribbons from example C, these spools of ribbons were placed in a Dornier Tape Rapier Weaving Machine Type P1 Model PTST 2/E D4 25/40. This will produce a 48" wide/1" standard woven product. This product was then taken up on spools 48" wide. These may or may not be taken to a double Teflon belt laminator, heated to 150 degrees Fahrenheit, traveling at 10 ft/min, applying 10 psi. of pressure, then immediately leaving the heated zone into a room temperature zone where the product is cooled to 80 degrees Fahrenheit. This product could then be taken up on spools for shipment to customers. One of many applications for this unique material would be the ability to construct a multiple ply moldable ballistic vest that is capable of being custom fit to the military, law enforcement or security personnel that it is intended to protect. Other customizable ballistic components can also be fashioned or molded to fit arms, legs, neck, groin, or any other areas on the human body. A Second application could be simply molding multiple ply's to construct or produce athletic padding across a wide range of sports and activities. A third example would be taking multiple ply's of this material and molding it into a nonmetallic safety toe cap for the boot and shoe industry. A fourth example would be selling this material into a sheet form to the broad consumer industry including but not limited to sporting goods, camping, medical, dental, home improvement, plumbing, shoe/apparel, ladies undergarments, animatronics/robotics, orthotics and prosthetics, general repairs, boating and marine etc.

Example E: For this example a Dyneema SK75 Dtex 2640 HDPE roving was selected along with a Dow ATTANE 4404G ultra low density polyethylene polymer. Six ends of this reinforcing fiber were loaded on to a creel and 1.5 lbs. of tension was applied to each roving. These fibers were then drawn across a series of heated pins spreading them to 1.5" in width and heating them to 240 degrees Fahrenheit. At this point they were introduced to a ATTANE 4404G polymer stream, applying enough polymer to the top surface of this heated band of reinforcing fiber at a rate to give the final impregnated tape a 50% by weight fiber, 50% by weight polymer, fully impregnated system. These impregnated tows were drawn across several heated pins in which the polymer was uniformly dispersed amongst all of the fiber filaments. Once this tow bundle was determined to be fully impregnated, it was narrowed down to a width of 1" and a thickness of 0.015". The fiber was then introduced to two more pins, uniformly setting these dimensions. Once these dimensions were set this "hot" impregnated tape was introduced to two alternating chilled rolling cylinders, each with a 15/16" groove, to set a width that when introduced to four more alternating cylinders allowed the tow to spread to 1" in width. This chilled, impregnated ribbon was then taken up on master spools. These spools were then removed and placed on packaging equipment, of which spools of ribbon were produced to a given length, which may then be distributed to customers. These spools are sold as a retail package into a broad range of markets including but not limited to sporting goods, camping, medical, dental, home improvement, plumbing, shoe/apparel, ladies undergarments, animatronics/robotics, orthotics and prosthetics, general repairs, boating and marine etc. where a higher application temperature is required, in the range between 130 F and 180 F.

A unique product that can be constructed from this material is to replace metal or steel banding straps in the consumer and industrial packaging and shipping markets. The unique feature of these substantially impregnated tapes is that when they are re-heated to 255 degrees Fahrenheit and placed in full contact with another ribbon of the same chemistry, not necessarily the same size or dimension, and then cooled to room temperature they form a single unit or structure with no discernable unit separation. They form a single homogeneous part in any number of multiple units. When two ribbons are heated, applied in full contact with one another and cooled under contact the mechanical properties are twice the mechanical properties of a single unit. Physical separation back into two units is difficult unless 255 degrees Fahrenheit in temperature is reapplied. They can be molded and fashioned an innumerable amount of time, using this heating and cooling scenario. A single band, looped upon itself, with an overlap of 1", under these molding conditions and cooled, exhibited 26,000 psi in tensile strength. The tensile strength can be varied by simple adding or decreasing the number of rovings placed within the product and altering the resin flow to a given percentage.

Example F: Using the spooled ribbons from example E, these spools of ribbons were placed in a Dornier Tape Rapier Weaving Machine Type P1 Model PTST 2/E D4 25/40. This will produce a 48" wide/1" standard woven product. This product was then taken up on spools 48" wide. These may or may not be taken to a double Teflon belt laminator, heated to 255 degrees Fahrenheit, traveling at 10 ft/min, applying 10 psi. of pressure, then immediately leaving the heated zone into a room temperature zone where the product is cooled to 80 degrees Fahrenheit. This product could then be taken up on spools for shipment to customers.

Example G: A Toray 12K (12,000 filaments/roving) Carbon Fiber was selected for this product, along with the Desmomelt polymer system. 4 ends of reinforcing fiber were loaded on the creel and 3 lbs. of tension were applied to each roving. These carbon fibers were then spread over a series of heated pins and heated to a temperature of 450 degrees Fahrenheit. At that temperature a melt stream of the Desmomelt polymer system was introduced to the top of these heated fibers at a rate to give the final impregnated tape a 60% by weight fiber, 40% by weight polymer, fully impregnated system. These impregnated tows were drawn across several heated pins in which the polymer was uniformly dispersed amongst all of the carbon fiber filaments. Once this tow bundle was determined to be fully impregnated, it was narrowed down to a width of 1" and a thickness of 0.012". The fiber was then introduced to two more pins, uniformly setting these dimensions. Once these dimensions were set this "hot" carbon impregnated tape was introduced to two alternating chilled rolling cylinders, each with a 15/16" groove, to set a width that when introduced to four more alternating cylinders allowed the tow to spread to 1" in width. This chilled, carbon impregnated ribbon was then taken up on spools. These spools of ribbons were then removed and placed in a Dornier Tape Rapier Weaving Machine Type P1 Model PTST 2/E D4 25/40. This will produce a 12" wide/1" standard woven product. This product was then taken up on spools 12" wide. These spools were then taken to a double Teflon belt laminator, heated to 240 degrees Fahrenheit, traveling at 10 ft/min, applying 10 psi. of pressure, then immediately leaving the heated zone into a room temperature zone where the product is cooled to 80 degrees Fahrenheit. This product could then be taken up on spools for shipment to customers. One of many applications for this unique material is the ladies high fashion shoe industry, where this material is used both as an adhesive layer and a stiffening layer between leather or other similar products, in the areas of toe caps, heals, soles and stilettos.

Example H: For this example a Dyneema SK75 Dtex 1760 HDPE roving was selected along with a Perstorp CAPA 6400 a high molecular weight linear polyester derived from caprolactone monomer. Six ends of this reinforcing fiber were loaded on to a creel and 1.5 lbs. of tension was applied to each roving. These fibers were then drawn across a series of heated pins spreading them to 1.5" in width and heating them to 150 degrees Fahrenheit. At this point they were introduced to a CAPA 6400 polymer stream, applying enough polymer to the top surface of this heated band of reinforcing fiber at a rate to give the final impregnated tape a 50% by weight fiber, 50% by weight polymer, fully impregnated system. These impregnated tows were drawn across several heated pins in which the polymer was uniformly dispersed amongst all of the Dyneema fiber filaments. Once this tow bundle was determined to be fully impregnated, it will be split back into its original rovings creating six smaller bands moving across the heated pins. We will continue to pull the fiber downstream until the material is no longer molten. The fiber was then pulled across a grooved, canted roller, twisting each individual roving back to the last stationary heated pin, twisting them into a cylindrical thread, lace, cord or rod. This chilled, impregnated thread, lace, cord or rod was then taken up on spools. These threads, lace, cord or rods can then be sold into either the consumer or industrial marketplace including but not limited to the areas of sporting goods, camping, medical, dental, home improvement, plumbing, shoe/apparel, ladies undergarments, animatronics/robotics, orthotics and prosthetics, general repairs, boating and marine etc. One unique application that these individual cords can service is that they can be braided into a rope, tether, leash, or strap that has the unique ability of when looped back on itself, heated, and then allowed to cool, eliminates the need for end fastening systems. This not only eliminates the need for end fastening systems but eliminates the weak point in all of these linear braided applications.

Example I: Using the spooled thread, lace, cord or rod from example H, these spools of ribbons were placed in a Dornier P1 Rapier Weaving Machine which is designed to weave thicker, tighter fabrics. This will produce a 48" 12 picks per inch standard woven product. This product was then taken up on spools 48" wide. These may or may not be taken to a double Teflon belt laminator, heated to 150 degrees Fahrenheit, traveling at 10 ft/min, applying 10 psi. of pressure, then immediately leaving the heated zone into a room temperature zone where the product is cooled to 80 degrees Fahrenheit. This product could then be taken up on spools for shipment to customers. These will usually produce much thicker sheets of material with lower mechanical properties.

Example J: For this example, a Dyneema SK75 Dtex 2640 HDPE roving was selected along with a Perstorp CAPA 6400 a high molecular weight linear polyester derived from caprolactone monomer. Six ends of this reinforcing fiber were loaded on to a creel and 1.5 lbs. of tension was applied to each roving. These fibers were then drawn across a series of heated pins spreading them to 1.5" in width and heating them to 150 degrees Fahrenheit. At this point they were introduced to a CAPA 6400 polymer stream, applying enough polymer to the top surface of this heated band of reinforcing fiber at a rate to give the final impregnated tape a 50% by weight fiber, 50% by weight polymer, fully impregnated system. These impregnated tows were drawn across several heated pins in which the polymer was uniformly dispersed amongst all of the fiber filaments. Once this tow bundle was determined to be fully impregnated, it was narrowed down to a width of 1" and a thickness of 0.015". The fiber was then introduced to two more pins, uniformly setting these dimensions. Once these dimensions were set this "hot" impregnated tape was introduced to two alternating chilled rolling cylinders, each with a 15/16" groove, to set a width that when introduced to four more alternating cylinders allowed the tow to spread to 1" in width. This chilled, impregnated ribbon was then coated on one or both sides with a Loctite high performance middleweight bonding spray adhesive, creating an adhesive tape which can then be spooled. These spools were then removed and placed on packaging equipment, of which spools of ribbon were produced to a given length, which may then be distributed to customers. These spools could be sold as a retail package into a broad range of markets including but not limited to sporting goods, camping, medical, dental, home improvement, plumbing, shoe/apparel, ladies undergarments, animatronics/robotics, orthotics and prosthetics, general repairs, boating and marine etc. This and other adhesives are applied to our ribbon to produce an adhesive tape for the purposes of bonding it to itself until temperature can be applied to melt the matrix resin to form a single homogeneous unit. Adhesive is applied to both sides where an exterior cover of a varying material such as organic cloths, leathers or other plastics are needed for the particular application. A specific example would be applying a woven cloth to the exterior and interior of athletic padding for the purpose of moisture and perspiration wicking.

Figure 6A:
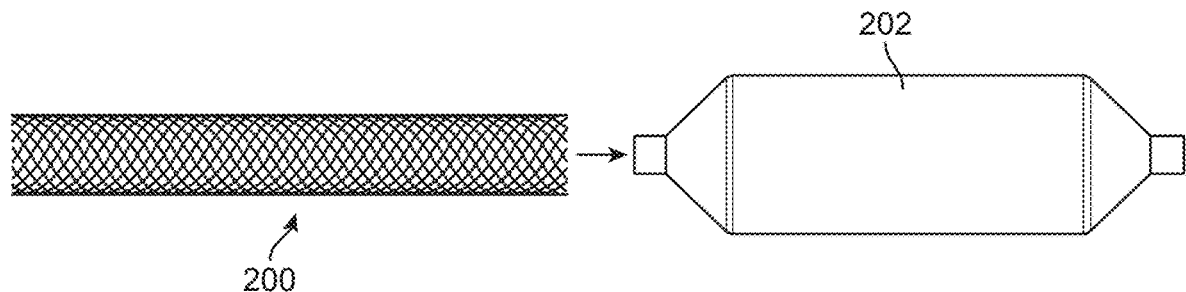
FIG. 6A-6C show an exemplary thermoplastic sleeve placed over an object, in accordance with the present disclosure.
Figure 6B:
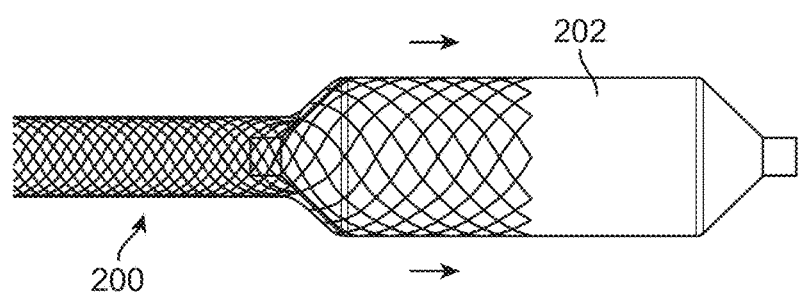
Figure 6C:
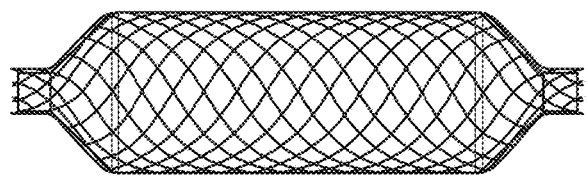
Figure 7A:
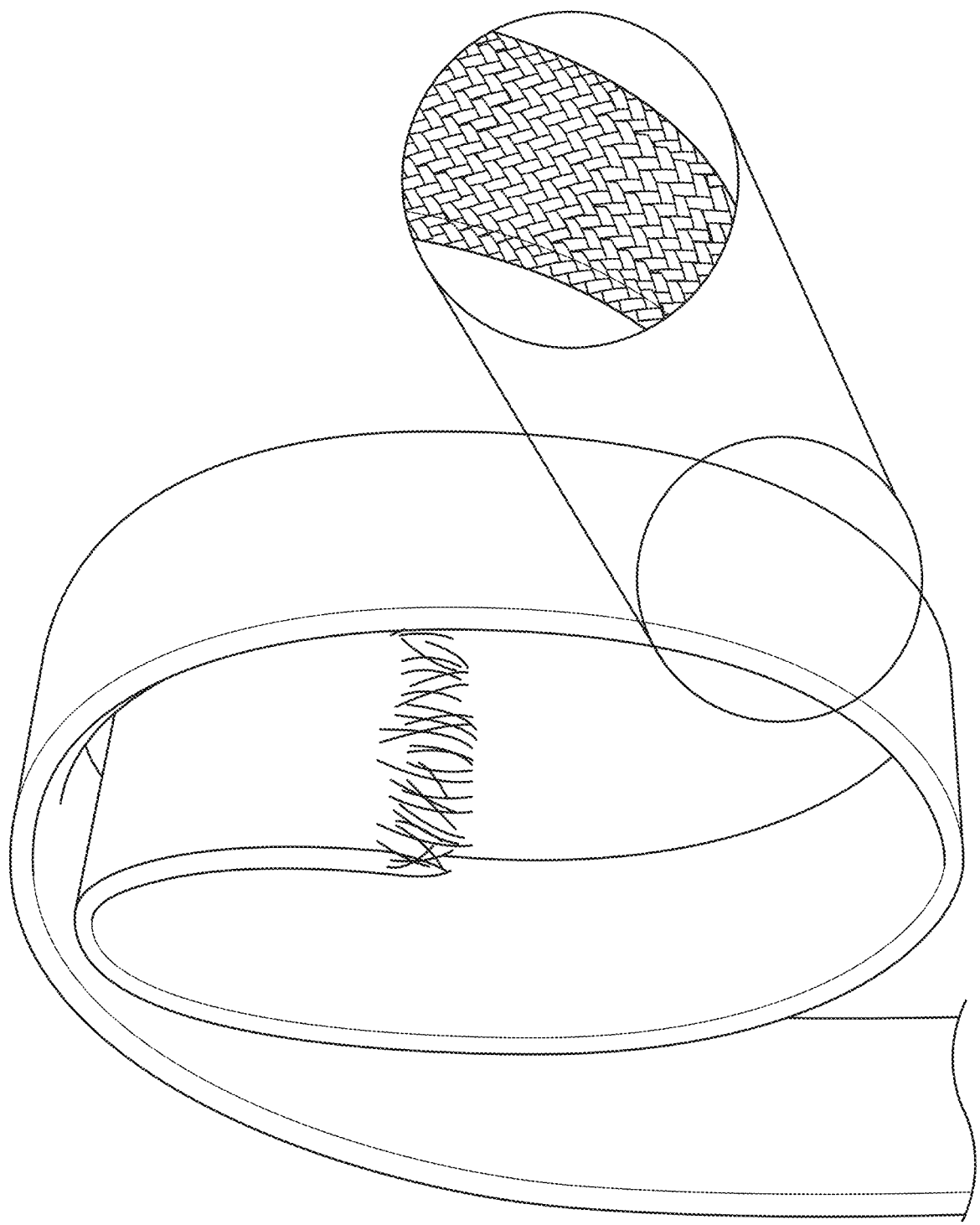
FIGS. 7A and 7B show exemplary tubes with enlarged areas illustrating braids of the tube, in accordance with the present disclosure.
Figure 7B:
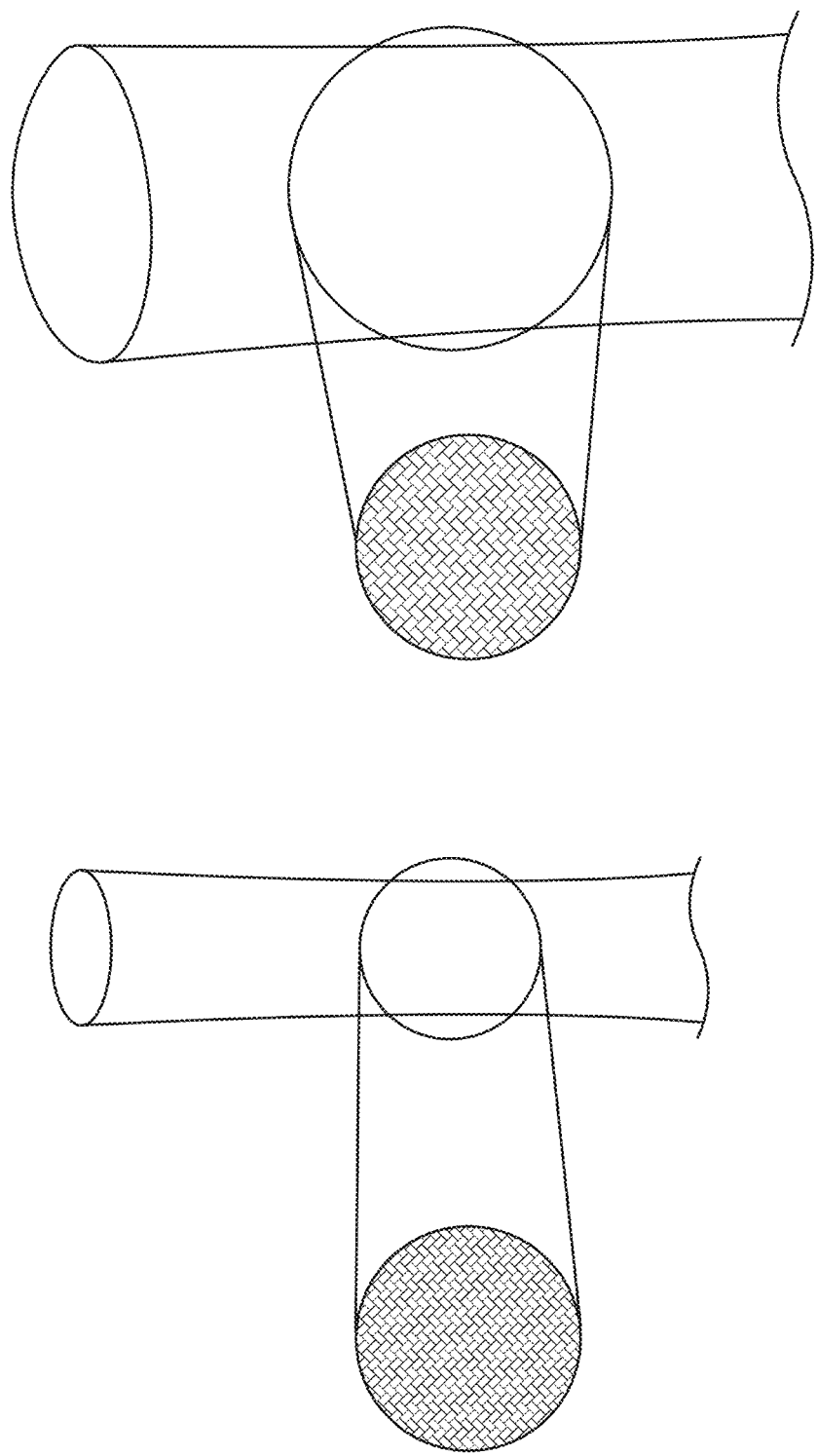

FIG. 6A-6C show an exemplary thermoplastic sleeve 200 placed over an object 202. The object is exemplary. It is contemplated that the object may be most any tangible, physical object. The sleeve 200 may be formed of braided ribbons. In various embodiments, a tape, ribbon, or sheet can be constructed by utilizing methods and techniques discussed herein above including, e.g., impregnation of low temperature resins with reinforcing fibers, and the taking those impregnated strands and subsequently knitting, i.e., weaving, them into a ribbon. In one embodiment, a tube may be braided such as shown in FIG. 6B and then under enough heat to melt the resin, then applying enough pressure to collapse and consolidating the tubular structure, or consolidate the knitted structure. Thereby producing a ribbon that when reheated can move in a three-dimensional manner, which may conform to the intricacies of the human body including the human mouth and teeth. These three-dimensional tapes or ribbons could be produced in almost limitless sizes, thicknesses, and configurations. With either braiding or knitting, different fiber inputs could be utilized in a single tape construction by simply altering, alternating, or mixing the bobbin inputs utilized in constructing a braided or knitted product. The mixing or blending of different fiber inputs, such as carbon, HDPE, aramid, fiberglass, polyester, and others could be used to modify physical properties such as tensile strength, modulus, impact resistance, elongation and other physical characteristics.

For some medical applications, such as casts, splints, or boot formation for prosthesis fittings, the braided tubular structure would not be consolidated into a tape but rather left in its tubular form and then consolidated and fitted once slid on to what it is designed to reinforce or protect. Again, a combination of reinforcing filaments may be used to alter physical characteristics and properties.

Example I. First, 24 individual wound packages of 1/16" wide, 0.003" thick, HDPE fiber/caprolactone polymer at a 30% by weight fiber concentration, were produced using techniques described hereinabove. These inputs were then loaded on to a braiding unit and a 1" diameter braided tube was produced having a wall thickness of 0.006". A 1000 ft. spool of this braided tubular structure was pancake wound on a spool. This spool was then taken and placed on a consolidation unit where this material was unwound under light tension, run through a IR oven where the tube was heated to 160 degrees Fahrenheit. This heated braided structure continued through a series of Teflon coated rollers (male/female configuration) that are under 20 psi of pressure. The female roller slot and opposing male roller were machined with a 2" flat configuration. A series of 10 of these rollers, 4" in diameter each were placed in a line. They had cooling passing through them to keep them at a nominal 40 degrees Fahrenheit. This produced a braided tape 2" in width and 0.120" in thickness. This consolidated tape or ribbon was wound on to spools. This tape can be used in everything from finger splinting material to selectively reinforcing pure caprolactone polymer sheet for additional strength and modulus.

Example II. First 16 packages of 1/16" wide, 0.004" thick, 675 yield E glass fiber/caprolactone resin at a 40% by weight fiber concentration were constructed. Next 16 packages of 1/16" wide, 0.003" thick 6K carbon fiber, 30% by weight fiber concentration were also constructed. These helically wound packages were loaded onto a braiding machine in an alternating configuration (carbon, glass, carbon, glass, etc,) and a 3/4" tubular structure was braided having a wall thickness of 0.012". This multi-reinforcement braided structure was then passed through the same consolidation unit as before except that the roller slots and opposing male roller were cut to produce a 1½" slot/tape. This tape/ribbon ended up 1½" wide with a 0.020" thickness. The tape had a modulus over 10 times that tape in example I.

Example III. First 64 packages of 1/16" wide, 0.004" thick, HDPE fiber/caprolactone resin at a 20% by weight fiber concentration. Next 128 packages of 1/16" wide, 0.003" thick 6 k carbon fiber, 30% by weight fiber concentration were also constructed. Each of these materials were separately braided into a 4½" diameter tube. Both materials were taken up into separate rolls. The braided HDPE material was the inner material (next to the skin) while the thicker carbon fiber material was the outer layer in forming a socket over a stump while the other end was connected to a prosthesis for an amputee. Once stretched over the stump 140-degree heat (Fahrenheit) was applied until both layers were melted. The two layers are then melded together with simple hand pressure from fitting to the stump. Once cooled for 12 hours to allow the full crystallization of the resin you have a field ready prosthetic device without the need for a lab or sending out material to be manufactured. If the patient is a child the prosthetic socket can be reheated and cooled to allow for growth of the child.

Example IV. First 24 packages of 1/32" wide, 0.003" thick HDPE fiber/caprolactone resin at a 30% by weight fiber concentration. All 24 packages or inputs where loaded onto a braiding unit and a ½" diameter braided tube was produced. This braided tube was then passed through the same set of consolidation parameters as in Example 1, except that a 1" wide consolidated ribbon was produced. These consolidated ribbons are then subsequently loaded onto a Dornier Rapier loom, 12 packages in the warp direction and one package in the weft direction. A plain weave 12" wide broad goods was at 100 pics or inches/min. This woven structure is then passed through a dual Teflon belt laminator having a heating zone set 150 degrees Fahrenheit and a cooling zone at 50 degrees Fahrenheit. These belts were under 10 psi of pressure and moving at 10 ft./min. This produced a continuous, solid, homogenous sheet that can be cut into desired lengths and widths at any time. These sheets when reheated at 140 F can be formed into any desired 3-dimensional shape, conforming to almost any part of the human anatomy. These sheets and be laminated together to add additional strength, modulus, and impact resistance where needed.

Example V. First 68 packages of 1/64" wide, 0.005" thick PET (polyester) fiber/caprolactone (polyester) resin at a 50% by weight, where loaded onto a braiding unit and a 1½" braided tube was produced. A polyester fiber was chosen for this application since very limited physical attributes are needed. It acts as a carrier for the resin, it bonds very well to the resin, and can be colored or tinted. This braided structure can be slipped over any handle, grip, device, control lever, etc. Once it is cut to desired length it can be heated to 140 F and then with simple hand pressure from the user's grip (squeezed) and allowed to cool under grip pressure an extremely custom grip has been formed exactly to the user's hand.

Example VI. First 136 packages of the same material in Example 5 are braided into a 2½' tube. This tube is then stretched over any revolver up to the mid-point of the trigger guard and below or up to the hammer. The material is then heated with a blow dryer or heat gun to a temperature of 140 F and then allowed to cool. Once cooled the braided tube is cut off at the barrel termination. Attach any belt loops or clips and a custom fit holster has been created.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

The invention claimed is:

1. A thermoplastic prepreg comprising:
a plurality of continuous fibers that are substantially oriented in a longitudinal direction, the continuous fibers constituting from about 30 wt. % to about 40 wt. % of the prepreg;
a first resinous matrix that contains a first set of one or more thermoplastic polymers and within which the continuous fibers are embedded, wherein the thermoplastic polymers constitute from about 30 wt. % to about 40 wt. % of the prepreg; and
a second resinous matrix that contains a second set of one or more thermoplastic polymers, wherein the second set of thermoplastic polymers constitute from about 30 wt. % to about 40 wt. % of the prepreg; and
wherein the second resinous matrix forms a layer around the first resinous matrix and the continuous fibers, wherein the layer is formed by extruding the first resinous matrix and the continuous fibers with the second resinous matrix within an impregnation die, while the first resinous matrix and the continuous fibers is twisted and under tension.

2. The thermoplastic prepreg of claim 1, wherein the first set of one or more thermoplastic polymers and the second set of one or more thermoplastic polymers are comprise different thermoplastic polymers.

3. The thermoplastic prepreg of claim 1, wherein the first set of one or more thermoplastic polymers and the second set of one or more thermoplastic polymers are comprise the same thermoplastic polymers having different molecular weights.

4. The thermoplastic prepreg of claim 1, wherein the second set of one or more thermoplastic polymers do not embed the continuous fibers.

5. The thermoplastic prepreg of claim 1, wherein the first set of one or more thermoplastic polymers comprise higher modulus and strength compared with the second set of one or more thermoplastic polymers.

6. The thermoplastic prepreg of claim 1, wherein the second set of one or more thermoplastic polymers comprises a higher molecular weight than the first set of one or more thermoplastic polymers.

7. The thermoplastic prepreg of claim 1, wherein the second set of one or more thermoplastic polymers comprises a polymer pre-blended with talc material.

8. The thermoplastic prepreg of claim 1, wherein the second set of one or more thermoplastic polymers comprises a flame retardant additive.

9. The thermoplastic prepreg of claim 1, wherein the second set of one or more thermoplastic polymers comprises mica or fiberglass.

10. The thermoplastic prepreg of claim 1, wherein the second set of one or more thermoplastic polymers comprises copper or nickel particulate.

11. A thermoplastic prepreg comprising:
a plurality of continuous fibers that are substantially oriented in a longitudinal direction, the continuous fibers constituting from about 30 wt. % to about 40 wt. % of the prepreg;
a first resinous matrix that contains a first set of one or more thermoplastic polymers having fiber stabilizing characteristics and within which the continuous fibers are embedded, wherein the thermoplastic polymers constitute from about 30 wt. % to about 40 wt. % of the prepreg; and
a second resinous matrix that contains a second set of one or more thermoplastic polymers, wherein the second set of thermoplastic polymers constitute an additional 30 wt. % to about 40 wt. % of the prepreg, wherein the second resinous matrix coats the first resinous matrix; and
wherein the second resinous matrix forms a layer around the first resinous matrix and the continuous fibers, wherein the layer is formed by extruding the first resinous matrix and the continuous fibers with the second resinous matrix within an impregnation die, while the first resinous matrix and the continuous fibers is twisted and under tension.

12. The thermoplastic prepreg of claim 11, wherein the first set of one or more thermoplastic polymers is added in an amount to whet out the filament surfaces of the continuous fibers.

13. The thermoplastic prepreg of claim 11, wherein the second set of one or more thermoplastic polymers comprises polymers having characteristics adapted for a composite article to be molded.

14. The thermoplastic prepreg of claim 11, wherein the first set of one or more thermoplastic polymers comprise higher modulus and strength compared with the second set of one or more thermoplastic polymers.

15. The thermoplastic prepreg of claim 11, wherein the second set of one or more thermoplastic polymers comprises a higher molecular weight than the first set of one or more thermoplastic polymers.

16. The thermoplastic prepreg of claim 11, wherein the second set of one or more thermoplastic polymers comprises a polymer pre-blended with talc material.

17. The thermoplastic prepreg of claim 11, wherein the second set of one or more thermoplastic polymers comprises mica or fiberglass.

18. The thermoplastic prepreg of claim 11, wherein the second set of one or more thermoplastic polymers comprises copper or nickel particulate.

* * * * *